(12) United States Patent
Kurokawa et al.

(10) Patent No.: US 12,392,995 B2
(45) Date of Patent: Aug. 19, 2025

(54) OPTICAL SYSTEM, IMAGE PICKUP APPARATUS, IN-VEHICLE SYSTEM, AND MOVING APPARATUS

(71) Applicant: CANON KABUSHIKI KAISHA, Tokyo (JP)

(72) Inventors: Shuichi Kurokawa, Saitama (JP); Makoto Takahashi, Tochigi (JP); Kazuhiro Inoko, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 732 days.

(21) Appl. No.: 17/580,891

(22) Filed: Jan. 21, 2022

(65) Prior Publication Data

US 2022/0236541 A1   Jul. 28, 2022

(30) Foreign Application Priority Data

Jan. 27, 2021 (JP) .................................. 2021-011189

(51) Int. Cl.
| | | |
|---|---|---|
| *G02B 9/64* | (2006.01) | |
| *B60W 30/095* | (2012.01) | |
| *G02B 13/00* | (2006.01) | |
| *G02B 13/06* | (2006.01) | |
| *G06T 7/50* | (2017.01) | |

(52) U.S. Cl.
CPC .......... *G02B 9/64* (2013.01); *B60W 30/0956* (2013.01); *G02B 13/0045* (2013.01); *G02B 13/06* (2013.01); *G06T 7/50* (2017.01); *B60W 2420/403* (2013.01); *B60W 2554/80* (2020.02); *G06T 2207/30261* (2013.01)

(58) Field of Classification Search
None
See application file for complete search history.

(56) References Cited

U.S. PATENT DOCUMENTS

| 9,517,637 B2 | 12/2016 | Kurokawa |
| 9,860,409 B2 | 1/2018 | Kurokawa |
| 10,663,842 B2 | 5/2020 | Takahashi |
| 11,029,586 B2 | 6/2021 | Takahashi |

(Continued)

FOREIGN PATENT DOCUMENTS

| EP | 3214474 A1 | 9/2017 |
| JP | 2004-354572 A | 12/2004 |

(Continued)

OTHER PUBLICATIONS

Extended European Search Report issued by the European Patent Office on May 27, 2022 in corresponding EP Patent Application No. 22152955.5.

(Continued)

*Primary Examiner* — William R Alexander
*Assistant Examiner* — Mackenzi Waddell
(74) *Attorney, Agent, or Firm* — Carter, DeLuca & Farrell LLP

(57) ABSTRACT

An optical system includes, in order from an enlargement conjugate side to a reduction conjugate side, a front unit including a plurality of lenses, an aperture stop, and a rear unit including a plurality of lenses. A projection characteristic of the optical system representing a relationship between a half angle of view and an image height on an image plane satisfies a predetermined condition.

22 Claims, 14 Drawing Sheets

(56) References Cited

U.S. PATENT DOCUMENTS

| | | | |
|---|---|---|---|
| 2013/0050405 A1* | 2/2013 | Masuda | G02B 13/06 |
| | | | 348/36 |
| 2017/0136961 A1* | 5/2017 | Harada | H04N 23/81 |
| 2017/0153430 A1 | 6/2017 | Ijima et al. | |
| 2018/0039049 A1* | 2/2018 | Lee | G02B 13/0045 |
| 2019/0011684 A1* | 1/2019 | Ishihara | G02B 17/08 |
| 2019/0265450 A1 | 8/2019 | Maetaki | |
| 2021/0116786 A1 | 4/2021 | Kurokawa | |
| 2021/0124156 A1 | 4/2021 | Takahashi | |
| 2022/0070434 A1* | 3/2022 | Nakamura | H04N 23/695 |

FOREIGN PATENT DOCUMENTS

| | | |
|---|---|---|
| JP | 2006343545 A | 12/2006 |
| JP | 2007-155976 A | 6/2007 |
| JP | 2010-128480 A | 6/2010 |
| JP | 2013045089 A | 3/2013 |
| JP | 2016207030 A | 12/2016 |
| JP | 2022028242 A | 2/2022 |
| JP | 2022-114766 A | 8/2022 |
| WO | 2016068095 A1 | 5/2016 |
| WO | 2019181284 A1 | 9/2019 |

OTHER PUBLICATIONS

Chinese Office Action issued by the China National Intellectual Property Administration on Mar. 8, 2024 in corresponding CN Patent Application No. 202210093283.3, with English translation.
Notice of Reasons for Rejection issued by the Japan Patent Office on Aug. 23, 2022 in corresponding JP Patent Application No. 2021-011189, with English translation.
Notice of Reasons for Refusal issued by the Japanese Patent Office on Nov. 12, 2024 in corresponding JP Patent Application No. 2022-187977, with English translation.

* cited by examiner

OPTICAL SYSTEM, IMAGE PICKUP APPARATUS, IN-VEHICLE SYSTEM, AND MOVING APPARATUS

BACKGROUND OF THE INVENTION

Field of the Invention

The present invention relates to an optical system suitable for an image pickup apparatus, such as an in-vehicle camera.

Description of the Related Art

The in-vehicle camera is utilized to acquire image data around the vehicle and to enable a user to visually recognize other vehicles and obstacles. An optical system having a distortion-corrected projection characteristic close to y=f× tan θ is suitable for an in-vehicle camera used in place of a rearview mirror that is mainly used to enable a user to visually recognize another vehicle in the distant rear position. On the other hand, a fisheye lens of y=f×θ (equidistant projection), y=2f×sin(θ/2) (stereographic (equisolid angle) projection), or y=f×sin θ (orthogonal projection) is suitable for an in-vehicle camera that is mainly used to monitor a wide area near the vehicle. However, these fisheye lenses with projection characteristics have low imaging magnifications and are difficult to use as a substitute for the rearview mirror. Hence, there is a demand for an optical system having a wide angle of view equivalent to that of a fisheye lens and a large imaging magnification in the central angle of view area.

Japanese Patent Laid-Open No. ("JP") 2004-354572 discloses an optical system called a foveal lens having a projection characteristic in which the imaging magnification in the central angle of view area is larger than that of the orthogonal projection method. JP 2007-155976 discloses an optical system as a foveal lens having a larger maximum angle of view (half angle of view 90°) than that of the optical system disclosed in JP 2004-354572 that has an insufficient maximum angle of view.

As the optical system disclosed in JP 2007-155976 is demanded to have a wider angle of view, the image sensor for acquiring the image data becomes larger and the camera accordingly becomes larger.

SUMMARY OF THE INVENTION

The present invention provides an optical system or the like that has a sufficient angle of view and a sufficient imaging magnification in a central angle of view area, and makes small an image pickup apparatus.

An optical system according to one aspect of the present invention includes, in order from an enlargement conjugate side to a reduction conjugate side, a front unit including a plurality of lenses, an aperture stop, and a rear unit including a plurality of lenses. A projection characteristic y(θ) of the optical system representing a relationship between a half angle of view θ and an image height y on an image plane satisfies the following inequality:

$$1 < \frac{f \times \sin\theta_{max}}{y(\theta_{max})} \leq 1.9$$

where θmax is a maximum half angle of view of the optical system, and f is a focal length of the optical system. A differential value dy(θ)/dθ at the half angle of view θ of the projection characteristic y(θ) has a local maximum value.

An image pickup apparatus according to another aspect of the present invention includes the above optical system, and an image sensor configured to image an object via the optical system. An in-vehicle system according to another aspect of the present invention includes the above image pickup apparatus, and a determiner configured to determine a likelihood of collision between a vehicle and the object based on distance information of the object acquired from the image pickup apparatus. A moving apparatus according to another aspect of the present invention includes the above image pickup apparatus, and movable while holding the image pickup apparatus.

Further features of the present invention will become apparent from the following description of exemplary embodiments with reference to the attached drawings.

DESCRIPTION OF THE EMBODIMENTS

Figure 1:
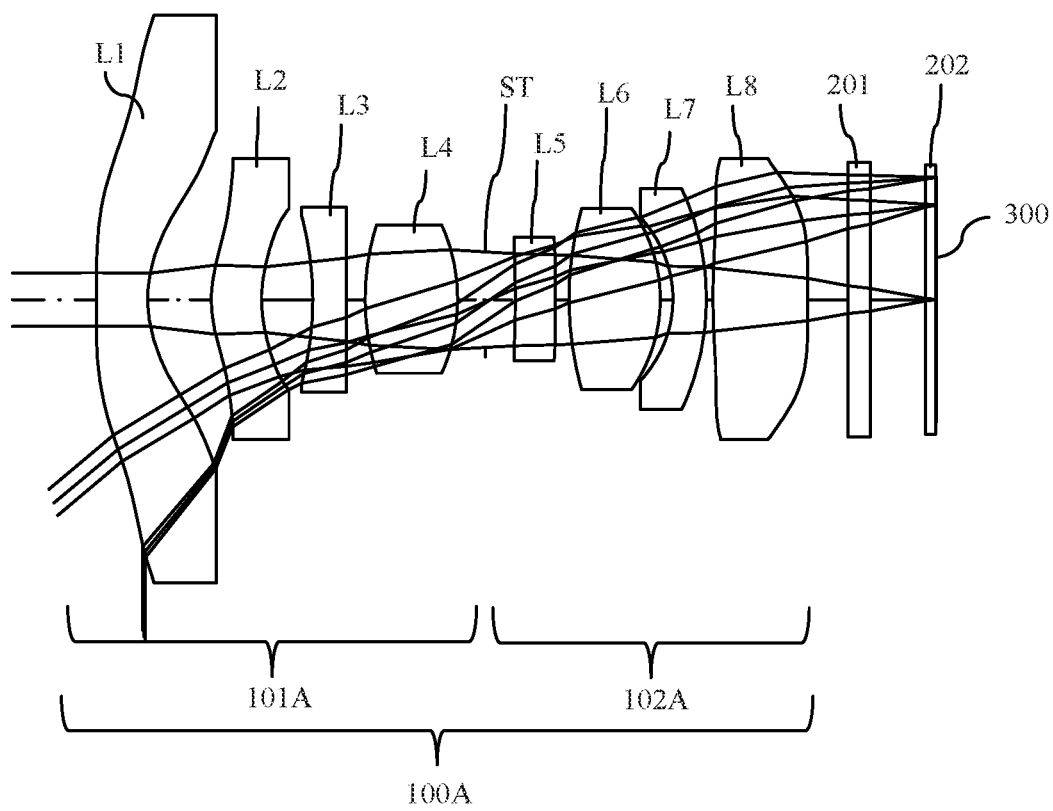
FIG. 1 is a sectional view of an optical system according to Example 1.

Referring now to the accompanying drawings, a description will be given of embodiments according to the present invention.

FIGS. 1, 5, 9, and 13 illustrate optical systems 100 (100A, 100B, 100C, and 100D) according to Examples 1, 2, 3, and 4, respectively. The optical system 100 according to each example is suitable for an image pickup apparatus such as a digital still camera, a digital video camera, an in-vehicle camera, a smartphone camera, a surveillance camera, a wearable camera, and a medical camera. In each figure, a left side is an enlargement conjugate side (object side), and a right side is a reduction conjugate side (image side). The optical system 100 according to each example is an imaging optical system that collects a light beam from an unillustrated object located on the enlargement conjugate side to form an object image on the image plane 300 on the reduction conjugate side. An imaging plane (light receiving surface) of an image sensor such as a CCD sensor and a CMOS sensor is disposed on the image plane. However, the optical system according to each example is a projection optical system of a projector that projects a light beam from a spatial light modulation element such as a liquid crystal panel disposed on the reduction conjugate side onto a projected surface such as a screen disposed on the enlargement conjugate side. In the following description, the optical system is used as an imaging optical system of an in-vehicle camera.

The optical system 100 according to each example includes, in order from an enlargement conjugate side to a reduction conjugate side, a front unit 101 (101A to 101D) having a plurality of lenses, an aperture stop (aperture stop) ST, and a rear unit 102 (102A to 102D) having a plurality of lenses. An IR cut filter 201 and a cover glass 202 are disposed between the optical system 100 and an image plane 300. A low-pass filter or the like may be additionally disposed as needed, or the IR cut filter 201 or the like may be omitted.

An aperture stop for limiting an off-axis light beam may be disposed between the front unit 101 and the aperture stop ST and between the aperture stop ST and the rear unit 102, respectively.

Example 1

In the optical system 100A according to Example 1 illustrated in FIG. 1, the front unit 101A includes four lenses L1, L2, L3, and L4. The rear unit 102A includes four lenses L5, L6, L7, and L8.

The lens L1 closest to the enlargement conjugate position in the front unit 101A (optical system 100A) is an aspherical lens (first aspherical lens) having aspherical surfaces on both the enlargement conjugate side and the reduction conjugate side. The paraxial refractive power (paraxial power) is negative.

The second lens L2 counted from the enlargement conjugate side in the front unit 101A is an aspherical lens (second aspherical lens) having aspherical surfaces on both sides and a positive paraxial refractive power.

The third and fourth lenses L3 and L4 counted from the enlargement conjugate side in the front unit 101A are spherical lenses having negative and positive refractive powers, respectively.

The lenses L5, L6, and L7, which are a lens closest to the enlargement conjugate position, and the second and third lenses counted from the enlargement conjugate side in the rear unit 102A, are spherical lenses having negative, positive, and negative refractive powers, respectively.

The lens (final lens) L8 closest to the reduction conjugate position in the rear unit 102A (optical system 100A) is an aspherical lens (third aspherical lens) having aspherical surfaces on both sides and a positive paraxial refractive power.

The optical system 100A according to this example includes no cemented lens and includes only single lenses. In-vehicle cameras may be placed in a high temperature environment (such as 70° C. or higher) exposed to direct sunlight in summer, and may be placed in a low temperature environment below zero in winter. Therefore, the cemented lens may cause peeling due to a difference in coefficient of linear expansion between cemented lens materials in the cemented lens, and thus only single lenses are used.

Table 1 summarizes a numerical example of the optical system 100A according to this example. (A) indicates a lens configuration, f denotes a paraxial focal length (also simply referred to as a focal length hereinafter) (mm), and Fno denotes an F-number. θmax denotes a maximum half angle of view (°). A radius of curvature r (mm) of an i-th plane, a distance d (mm) between an i-th plane and an (i+1) plane, a refractive index n for the d-line of each optical element, and an Abbe number ν based on the d-line of each optical element are indicated in order from the enlargement conjugate side.

The Abbe number ν is expressed as follows:

$$\nu = (Nd-1)/(NF-NC)$$

where Nd, NF, and NC are refractive indexes for the d-line (587.6 nm), the F-line (486.1 nm), and the C-line (656.3 nm) in the Fraunhofer lines.

ST denotes a position of the aperture stop. A surface with an asterisk * on the left side has an aspherical shape expressed by the following expression (1):

$$z = \frac{\frac{h^2}{r}}{1 + \sqrt{1 - (1+k)\left(\frac{h}{r}\right)^2}} + \sum_{j=1}^{16} B_j h^j \tag{1}$$

where h is a coordinate in a radial direction from the optical axis, z is a coordinate (sag amount) in the optical axis direction, r is a paraxial radius of curvature, and k is a conical constant. A sign of z is positive in a direction from the enlargement conjugate side to the reduction conjugate side.

(B) illustrates the conical constant k of each aspherical surface, and aspherical coefficients B4, B6, B8, B10, B12, B14, and B16. "E±x" means "10±x" All aspherical coefficients not specifically described are 0. The description of this numerical example is the same in other examples described later.

The optical system 100A according to this example is an optical system in which an angle formed by the optical axis and the most off-axis principal light ray, that is, a maximum half angle of view θmax is π/2 (=90°), and has a maximum half angle of view equivalent to that of the fisheye lens. The optical system 100A according to this example is an optical system in which an imaging magnification of the angle of view area near the center (referred to as a central angle of view area hereinafter) is larger than that of the fisheye lens.

Figures 2A, 2B:
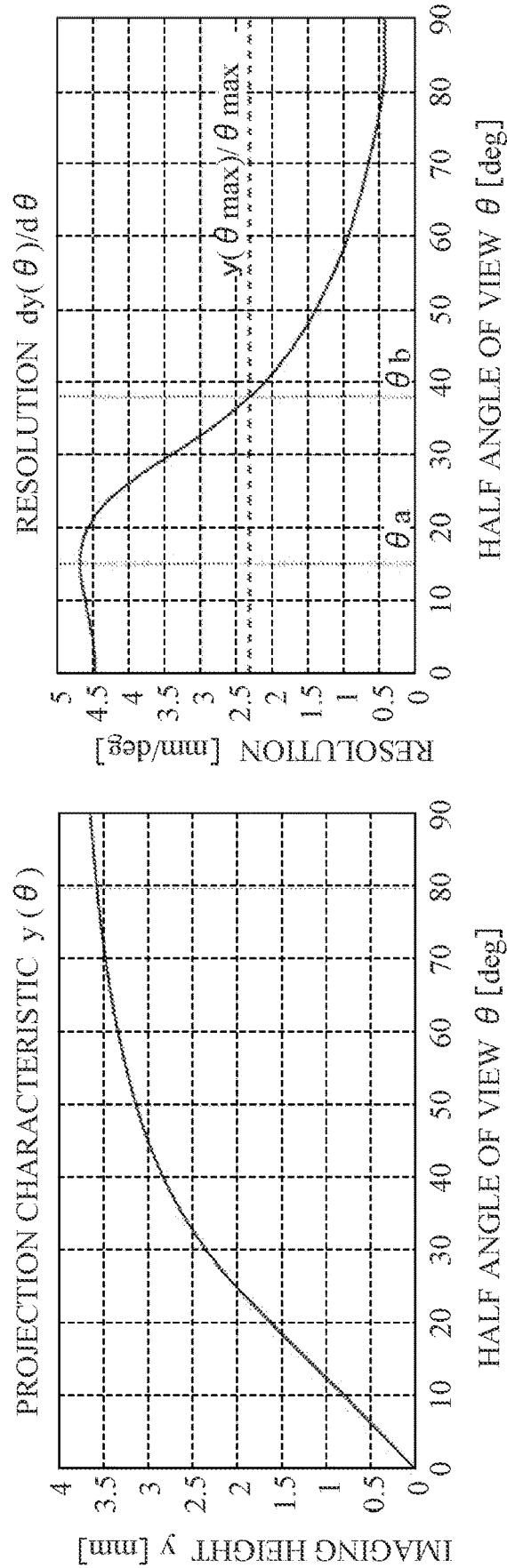
FIGS. 2A and 2B illustrate projection characteristics of the optical system according to Example 1.

FIGS. 2A and 2B illustrate the projection characteristic and the resolution characteristic of the optical system 100A according to this example, respectively. In FIGS. 2A and 2B, ° (deg) is used as a unit of the angle of view.

The projection characteristic y(θ) illustrated in FIG. 2(A) illustrates a relationship between a half angle of view (an angle formed by the optical axis and the incident light ray) θ and an imaging height (image height) y on the image plane 300. FIG. 2B illustrates a change amount in the imaging height y for a minute angle of view change at the half angle of view θ, that is, a differential value dy(θ)/dθ at the half angle of view θ of the projection characteristic y(θ). The differential value dy(θ)/dθ corresponds to a local resolution at the imaging height y, and the larger the value is, the higher the local resolution is. The high local resolution means a large local imaging magnification. The resolution in the following description means this local resolution.

The optical system 100A according to this example is characterized in that its projection characteristic y(0) satisfies the following inequality (conditional expression) (2):

$$1 < \frac{f \times \sin\theta_{max}}{y(\theta_{max})} \leq 1.9 \quad (2)$$

where f denotes a focal length of the optical system 100A, and θmax denotes a maximum half angle of view.

The optical system 100A according to this example has a resolution in the central angle of view area (referred to as a central resolution hereinafter) higher than that of the orthogonal projection method (y(θ)=f×sin θ) in which the central resolution is high among the projection methods for a general fisheye lens. If the value is lower than the lower limit in the inequality (2), the central resolution may become lower than that of the fisheye lens of the orthogonal projection method having the same maximum imaging height, or the maximum imaging height may become larger and the optical system may become larger.

If the value is higher than the upper limit in the expression (2), the resolution near the center becomes too high, and it becomes difficult to obtain an angle of view equivalent to that of the fisheye lens. Alternatively, even if the angle of view equivalent to that of the fisheye lens can be obtained, a good optical performance may not be secured in a high angle of view area.

The numerical range of the inequality (2) may be set as follows.

$$1 < \frac{f \times \sin\theta_{max}}{y(\theta_{max})} \leq 1.7 \quad (2)'$$

The numerical range of the inequality (2) may be set as follows.

$$1 < \frac{f \times \sin\theta_{max}}{y(\theta_{max})} \leq 1.4 \quad (2)''$$

In order to obtain a wide angle of view equivalent to that of the fisheye lens, the maximum half angle of view θmax may satisfy the following inequality (3). In the inequality (3), the radian is used as the unit of the angle of view.

$$\frac{\theta_{max}}{\pi} \geq \frac{7}{18} \quad (3)$$

If the following inequalities (3)' and (3)" are satisfied, a wide angle of view closer to that of the fisheye lens can be obtained.

$$\frac{\theta_{max}}{\pi} \geq \frac{4}{9} \quad (3)'$$

$$\frac{\theta_{max}}{\pi} \geq \frac{1}{2} \quad (3)''$$

The optical system 100A according to this example has a characteristic close to the projection characteristic (y=f×tan θ) of a normal imaging optical system so as to suppress the optical distortion in the low angle of view area and to prevent a decrease in central resolution. As understood from FIG. 2B, a resolution higher than an on-axis resolution (at an angle of view θ) can be obtained in the low angle of view area.

Since the optical distortion is suppressed in the low angle of view area, the distortion near the center of the captured image is decreased, so that the detection accuracy of other vehicles such as the preceding vehicle and the following vehicle can be improved. When a captured image in the low angle of view area is displayed on a monitor instead of a rearview mirror, a natural perspective can be visually obtained, and the electronic distortion correction becomes unnecessary or a correcting amount can be reduced. Therefore, a good visibility can be obtained while the image deterioration is suppressed.

In the optical system 100A according to this example, the resolution in the low angle of view area increases as the angle of view increases from the optical axis, and the resolution in the high angle of view area decreases as the angle of view increases. Hence, as illustrated in FIG. 2B, the resolution has a local maximum value at a half angle of view θa, which is a boundary between the low angle of view area and the high angle of view area.

Conversely, when the optical system 100A is configured so that the resolution has a local maximum value at the half angle of view θa, a projection characteristic can be realized in which the resolution increases in the low angle of view area and the resolution decreases in the high angle of view area as the angle of view increases. The half angle of view θa at which the resolution (differential value dy(θ)/dθ) has the local maximum value may satisfy the following inequality (4).

$$0.15 \leq \frac{\theta_a}{\theta_{max}} \leq 0.35 \quad (4)$$

If the value is lower than the lower limit in the inequality (4), the low angle of view area having a high resolution becomes too narrow. If the value is higher than the upper limit in the inequality (4), the low angle of view area having a high resolution becomes too wide, and it becomes difficult to obtain an angle of view equivalent to that of the fisheye lens or it becomes difficult to secure a good optical performance in a high angle of view area even when the angle of view equivalent to that of the fisheye lens is obtained.

The numerical range of the inequality (4) may be set as follows.

$$0.15 \leq \frac{\theta_a}{\theta_{max}} \leq 0.30 \quad (4)'$$

The numerical range of the inequality (4) may be set as follows.

$$0.16 \leq \frac{\theta_a}{\theta_{max}} \leq 0.25 \qquad (4)''$$

Except for the on-axis position (at an angle of view of 0), at a half angle of view θ smaller than the half angle of view θa at which the resolution has the local maximum value, the projection characteristic y(θ) of the optical system 100A may satisfy the following inequality (5):

$$\frac{y(\theta)}{\theta} > f \qquad (5)$$

If the inequality (5) is not met, the resolution in the low angle of view area decreases. The on-axis position is excluded because y(θ)/θ is in principle equal to f on the optical axis regardless of the projection characteristic. In this example, y(θ) f×tan θ is met in the angle of view area where the half angle of view is smaller than θa, so that the inequality (5) is satisfied.

In order to obtain the high resolution in the low angle of view area and a wide angle of view equivalent to that of the fisheye lens, a half angle of view θb that satisfies the following inequality (6):

$$\frac{dy(\theta)}{d\theta} = \frac{y(\theta_{max})}{\theta_{max}} \qquad (6)$$

may satisfy the following inequality (7).

$$0.4 \leq \frac{\theta_b}{\theta_{max}} \leq 0.6 \qquad (7)$$

The right side of the inequality (6) is a value obtained by dividing the maximum imaging height y(θmax) by the maximum half angle of view θmax, and represents an average resolution. Therefore, the half angle of view θb is a half angle of view at which the actual resolution is equal to the average resolution. By setting the half angle of view θb that provides the average resolution to a value close to ½ of the maximum half angle of view, the balance between the resolution in the low angle of view area and the resolution in the high angle of view area can be improved, a high resolution in the low angle of view area and a good optical performance can be obtained, and the same wide angle of view as that of the fisheye lens can be secured.

If the value is lower than the lower limit in the inequality (7), the low angle of view area having a high resolution becomes too narrow. If the value is higher than the upper limit in the inequality (7), it becomes difficult to obtain a wide angle of view equivalent to that of the fisheye lens, or it becomes difficult to secure a good optical performance in a high angle of view area even if the wide angle of view equivalent to that of the fisheye lens can be obtained.

The numerical range of the inequality (7) may be set as follows.

$$0.4 \leq \frac{\theta_b}{\theta_{max}} \leq 0.5 \qquad (7)'$$

In the orthogonal projection method having a high central resolution among the projection methods of a general fisheye lens, when the maximum half angle of view θmax is π/2 as in this example, the resolution is 0 at the outermost peripheral angle of view (at the maximum half angle of view θmax). The resolution at the outermost peripheral angle of view of 0 is not suitable for the in-vehicle camera that is used to monitor the surroundings of the vehicle. The optical system 100A according to this example is configured so as to secure a resolution higher than a certain value rather than 0 even at the outermost peripheral angle of view when the maximum half angle of view θmax is π/2. More specifically, the resolution (differential value dy(θ)/dθ) at the angle of view (outermost peripheral angle of view) θ corresponding to the maximum half angle of view θmax may satisfy the following inequality (8):

$$0.03 \leq \frac{\frac{dy(\theta)}{d\theta}}{f} \leq 0.15 \qquad (8)$$

If the value is lower than the lower limit in the inequality (8), the resolution at the outermost peripheral angle of view becomes too low. If the value is higher than the upper limit in the inequality (8), the resolution at the outermost peripheral angle of view becomes high, and the angle of view area having a high resolution becomes too narrow.

The numerical range of the inequality (8) may be set as follows.

$$0.03 \leq \frac{\frac{dy(\theta)}{d\theta}}{f} \leq 0.12 \qquad (8)'$$

The numerical range of the inequality (8) may be set as follows.

$$0.03 \leq \frac{\frac{dy(\theta)}{d\theta}}{f} \leq 0.10 \qquad (8)''$$

In the optical system 100A according to this example, in order to realize the projection characteristic described above, the front unit 101A disposed on the enlargement conjugate side of the aperture stop ST includes the first aspherical lens L1. The first aspherical lens L1 can satisfactorily correct the off-axis aberration such as a curvature of field. The first aspherical lens L1 may have a negative paraxial refractive power. This configuration can easily correct the off-axis aberration with a wide angle of view equivalent to that of the fisheye lens.

The optical system 100A according to this example may include a second aspherical lens L2 on the reduction conjugate side of the first aspherical lens L1 in order to more effectively correct the off-axis aberration. The second aspherical lens L2 may have a positive paraxial refractive power. This configuration can easily correct the off-axis aberration while increasing the central resolution.

Each of the first aspherical lens L1 and the second aspherical lens L2 may be a meniscus-shaped lens having a convex surface facing the object side. This is advantageous in correcting the curvature of field.

Figure 3:
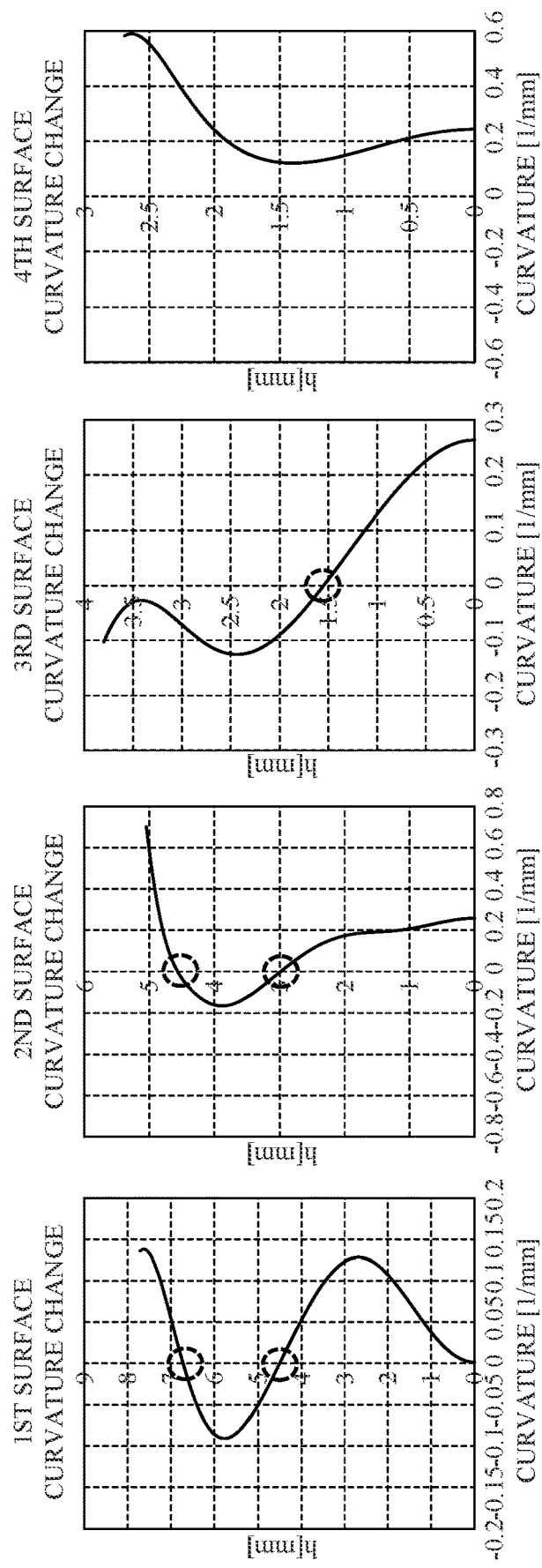
FIG. 3 illustrates curvatures of aspherical surfaces in the optical system according to Example 1.

FIG. 3 illustrates the curvatures of the aspherical surfaces (first surface, second surface) of the lens L1 and the aspherical surfaces (third surface, fourth surface) of the lens L2 for each radial position. In each figure, part surrounded by a broken line circle indicates an inflection point (a circle centered on the optical axis because it is a radial position) in which positive and negative signs of the curvature are reversed.

As described above, the optical system 100A according to this example suppresses the optical distortion in the low angle of view area and has a projection characteristic close to that of the normal imaging optical system (y=f×tan θ). When at least one of the aspherical surfaces of the lenses L1 and L2 has an inflection point, the projection characteristic in the low angle of view area is made closer to f×tan θ, and the optical distortion becomes easily suppressed.

When at least one of the aspherical surfaces (such as the first surface and the second surface) may have a plurality of inflection points, the resolution at the maximum half angle of view θmax can be easily made high.

The refractive index $n_1$ of the lens L1 for the d-line may satisfy the following inequality (9).

$$\frac{n_1}{16} \geq 1.0 \quad (9)$$

Since the lens L1 has a meniscus shape in which the surface on the enlargement conjugate side is a convex surface, if the refractive index of the lens L1 is low so as not to satisfy the inequality (9), the processing difficulty becomes higher because the sag amount of the meniscus shape and the aspherical surface amount increase. This is also not preferable in terms of the miniaturization such as shortening the optical path length and reducing the diameter of the optical system.

The refractive index $n_2$ of the lens L2 for the d-line may satisfy the following inequality (10).

$$\frac{n_2}{n_1} > 1.0 \quad (10)$$

As described above, the lens L1 has a negative paraxial refractive power, and the lens L2 has a positive paraxial refractive power. In order to reduce the Petzval sum, the refractive index $n_2$ of the lens L2 may be larger than the refractive index $n_1$ of the lens L1.

In order to obtain an angle of view equivalent to that of the fisheye lens while increasing the central resolution, the (paraxial) focal length fa of the front unit 101A may satisfy the following inequality (11).

$$\left|\frac{f}{f_a}\right| \leq 0.9 \quad (11)$$

If the value is higher than the upper limit in the inequality (11), the central resolution becomes lower than that of the fisheye lens of the orthogonal projection method, and it becomes difficult to obtain the wide angle of view equivalent to that of the fisheye lens, or to secure a good optical performance in the high angle of view area even when the wide angle of view equivalent to that of the fisheye lens can be obtained.

The lens L4 closest to the reduction conjugate position in the front unit 101A may be a lens with a convex surface facing the reduction conjugate side. In the off-axis light beam at a high angle of view, the coma occurs when the light beam is significantly bent by the lens L1, but the lens L4 may be the above lens for better corrections of the coma.

The lens L8 closest to the reduction conjugate position in the rear unit 102A may have a positive refractive power. Since the lens L8 is a lens closest to the reduction conjugate side having a large off-axis light beam height, the incident angle of the light ray on the image plane 300 in the high angle of view area can be reduced when the lens L8 has the positive refractive power. As a result, a wide angle of view equivalent to that of the fisheye lens can be easily obtained while securing a good optical performance and a high central resolution.

The lens L8 may be an aspherical lens because it is effective for better corrections of the off-axis aberration such as a curvature of field. However, if the lens L8 is an aspherical lens, the aspherical lens needs a positive refractive power in the periphery in order to maintain the effect of reducing the incident angle of the light ray on the image plane 300 in the high angle of view area.

In the rear unit 102A, the lens L6 and the lens L7 disposed on the enlargement conjugate side of the lens L8 may have positive and negative refractive powers, respectively. In order to shorten the overall length of the optical system 100A that forms an object image on the image plane 300 and to reduce the size of the optical system 100A, the focal length of the rear unit 102A as a whole needs to be positive. Therefore, the rear unit 102A needs a lens having a positive refractive power, but if the refractive powers of all lenses constituting the rear unit 102A are positive, for example, the spherical aberrations that occur in all the lenses constituting the rear unit 102A are summed up. Regarding the off-axis aberration such as the coma, when the lens L8 has a positive refractive power, it is more effective to dispose a lens having a negative refractive power at a position where the height of the off-axis light ray is large in order to correct the off-axis aberration. Hence, the refractive power of the lens L6 on the enlargement conjugate side may be positive and the refractive power of the lens L7 on the reduction conjugate side may be negative.

The refractive power of the lens L5 may be determined according to the sign of the focal length fa of the front unit 102A. In this example, since the focal length fa of the front unit 102A is positive, the refractive power of the lens L5 is set negative. Thereby, the residual spherical aberration of the front unit 102A can be corrected by the lens L5, and it becomes easier to obtain a better optical performance.

As described above, the lens L8 has an effect of reducing the incident angle of the light ray on the image plane 300 in the high angle of view area. Accordingly, the following inequality (12) may be satisfied:

$$0.4 \leq \frac{D}{L} \leq 0.6 \quad (12)$$

where D is a distance on the optical axis from the aperture stop ST to the surface on the reduction conjugate side of the lens L8, and L is an overall length of the optical system 100A (a distance from the surface on the enlargement conjugate side of the lens L1 to the surface on the reduction conjugate side of the lens L8).

This inequality (12) can increase the height of the off-axis light ray in the lens L8 while reducing the size of the optical system 100A in the radial direction. When the value is higher than the upper limit in the inequality (12), the height of the off-axis light ray in the lens L8 can be easily increased because the aperture stop ST is located on the enlargement conjugate side, but the diameter of the lens L8 becomes large. If the value is lower than the lower limit in the inequality (12), it is difficult to increase the height of the off-axis light ray in the lens L8 because the aperture stop ST is located on the reduction conjugate side, and moreover the diameter of the lens L1 becomes large.

The numerical range of the inequality (12) may be set as follows.

$$0.4 \leq \frac{D}{L} \leq 0.5 \qquad (12)'$$

Figure 4:
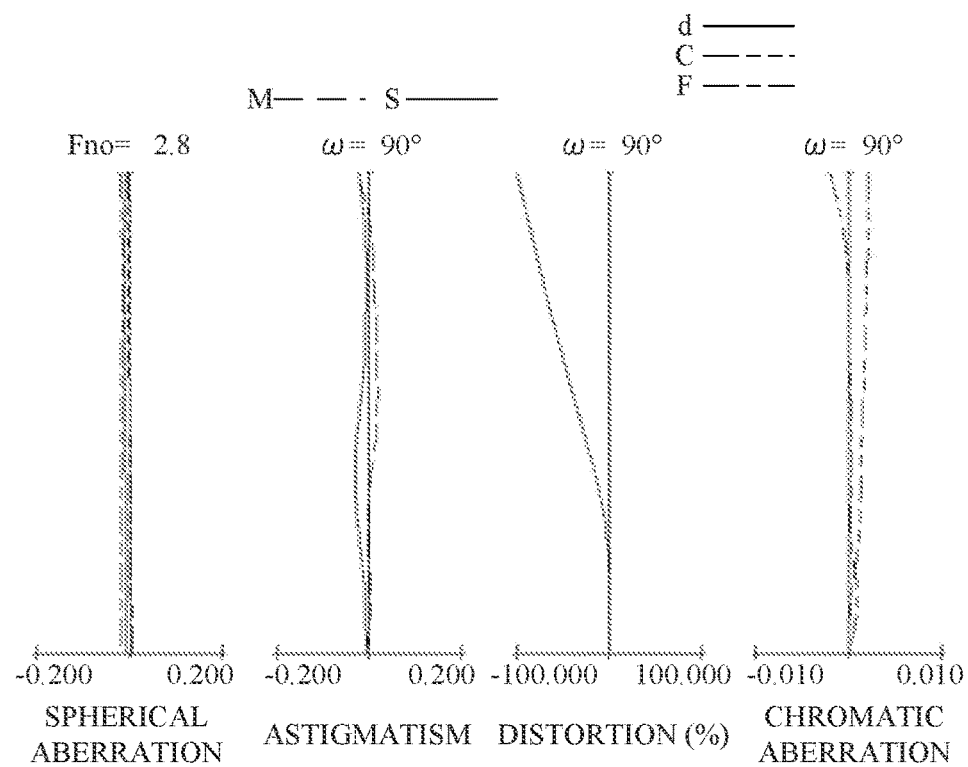
FIG. 4 illustrates aberration diagrams of the optical system according to Example 1.

FIG. 4 illustrates the longitudinal aberrations (spherical aberration, astigmatism, distortion, and lateral chromatic aberration) of the optical system 100A according to this example. In the spherical aberration diagram, Fno denotes an F-number, a solid line denotes the spherical aberration for the d-line (wavelength 587.6 nm), an alternate long and two short dashes line denotes the spherical aberration for the C-line (wavelength 656.3 nm), and an alternate long and short dash line denotes the spherical aberration for the F-line (wavelength 486.1 nm), respectively. In the astigmatism diagram, a solid line S denotes a sagittal image plane, and a broken line M denotes a meridional image plane. In the astigmatism diagram, a difference between the sagittal image plane and the meridional image plane is the astigmatism, each undulation denotes the curvature of field. The distortion is illustrated for the d-line. The chromatic aberration diagram denotes the lateral chromatic aberrations for the C-line and F-line. ω is a half angle of view (°). A horizontal axis of the spherical aberration diagram and the astigmatism diagram is set to ±0.2 mm, a horizontal axis of the distortion diagram is set to ±100%, and a horizontal axis of the chromatic aberration diagram is set to ±0.01 mm. The description of these aberration diagrams is the same in the other examples described later.

As understood from FIG. 4, in the optical system 100A according to this example, the spherical aberration, the curvature of field, the astigmatism, and the lateral chromatic aberration are satisfactorily corrected. The distortion is small in the low angle of view area and increases in the high angle of view area as the imaging height increases. The projection characteristic in the low angle of view area is close to y=f×tan θ in order to secure the high resolution.

Table 2 summarizes parameter values in this example (numerical example) and the values of each of the above inequalities (except for the inequality (5)). As understood from Table 2, the optical system 100A according to this example satisfies all of the inequalities. Therefore, the optical system 100A according to this example has a high central resolution, a wide angle of view equivalent to that of the fisheye lens, and a good optical performance.

Example 2

Figure 5:
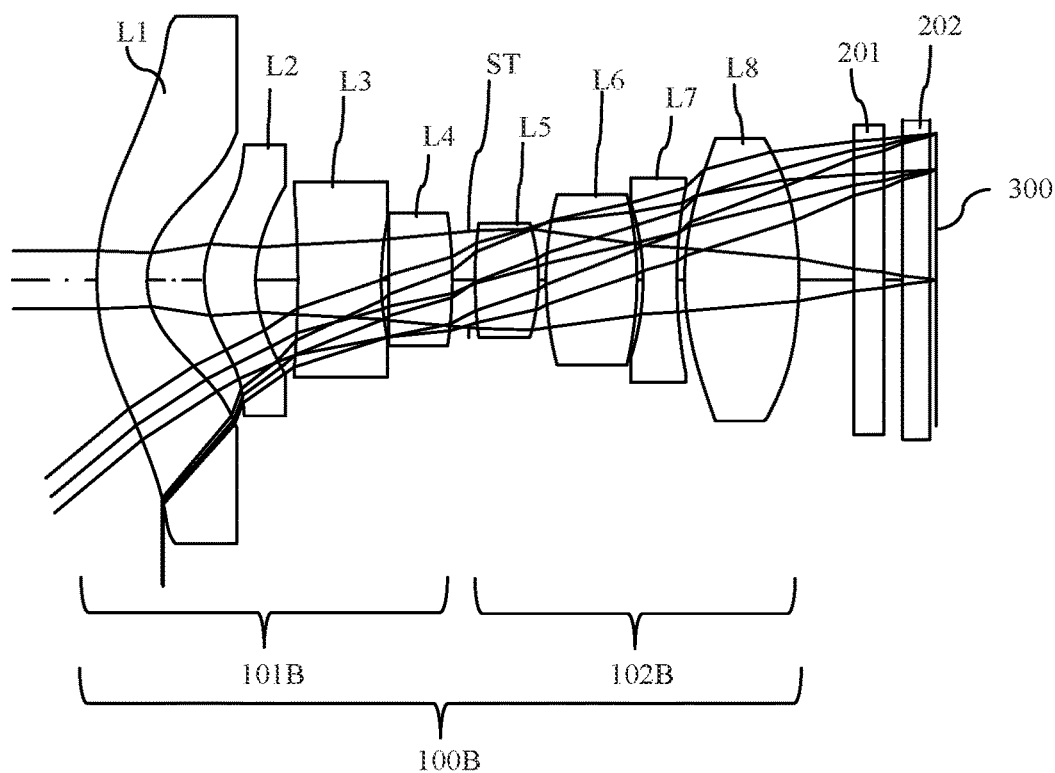
FIG. 5 is a sectional view of an optical system according to Example 2.

The basic configuration of the optical system 100B according to Example 2 illustrated in FIG. 5 is the same as that of the optical system 100A according to Example 1, and the components corresponding to those of the optical system 100A according to Example 1 will be designated by the same reference numerals.

The front unit 101B includes four lenses L1 to L4. The lens L1 is an aspherical lens (first aspherical lens) having aspherical surfaces on both sides, and has a negative paraxial refractive power. The lens L2 is an aspherical lens (second aspherical lens) having aspherical surfaces on both sides, and has a positive paraxial refractive power. The lenses L3 and L4 are spherical lenses, and have negative and positive refractive powers, respectively.

The rear unit 102B includes four lenses L5 to L8. The lenses L5, L6, and L7 are spherical lenses, and have positive, positive, and negative refractive powers, respectively. The sign of the refractive power of the lens L5 is different from that according to Example 1 because the sign of the focal length fa of the front unit 101A in this example is opposite to that of Example 1.

The lens L8 is an aspherical lens (third aspherical lens) including aspherical surfaces on both sides, and has a positive paraxial refractive power. The lens L8 has a positive refractive power also in the periphery as in Example 1.

Table 3 summarizes a numerical example of the optical system 100B according to this example. The optical system 100B according to this example is an optical system having a maximum half angle of view θmax of π/2, which is a maximum half angle of view equivalent to that of the fisheye lens.

Figure 6B:
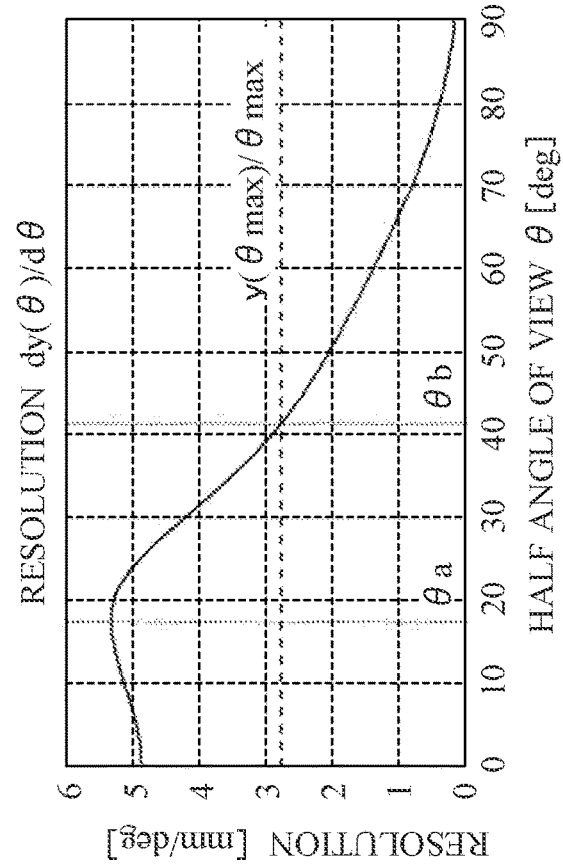
FIGS. 6A and 6B illustrate projection characteristics of the optical system according to Example 2.
Figure 6A:
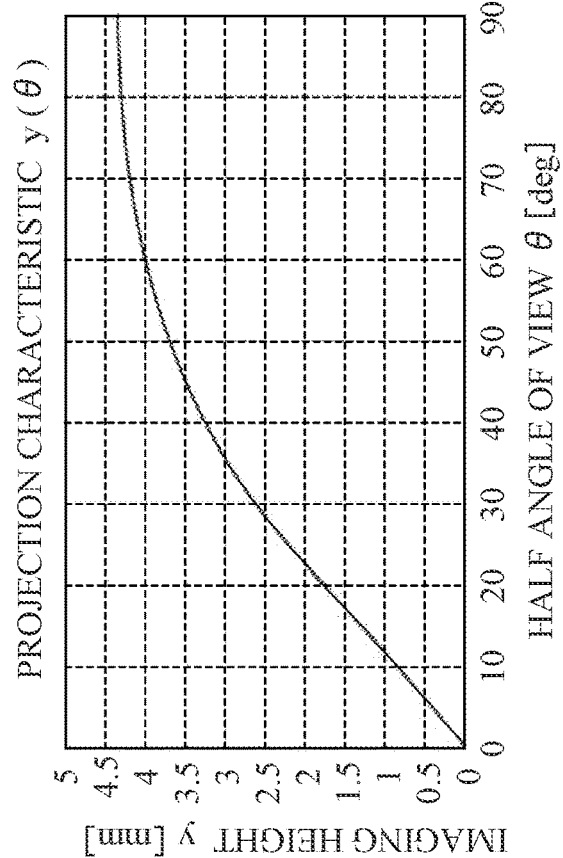

FIGS. 6A and 6B illustrate the projection characteristic and the resolution characteristic of the optical system 100B according to this example, respectively. As understood from these figures, the optical system 100B according to this example has a wide angle of view equivalent to that of the fisheye lens, and a central resolution higher than that of the fisheye lens.

Figure 7:
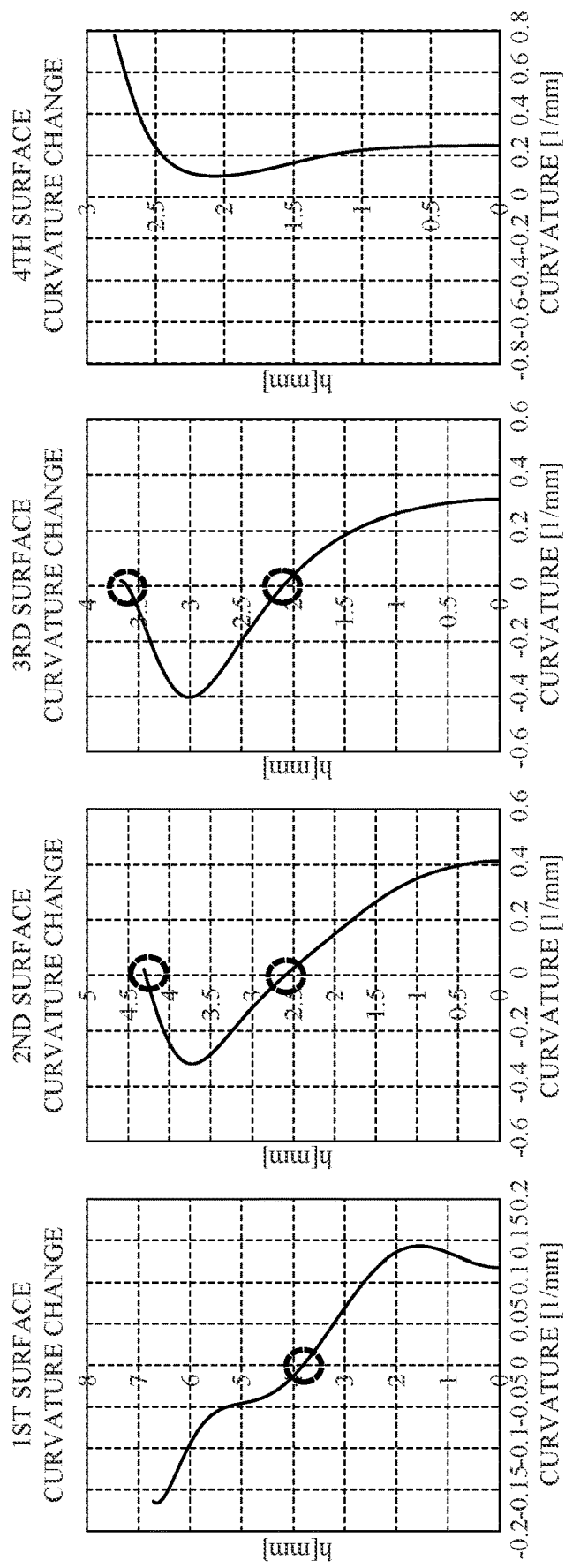
FIG. 7 illustrates curvatures of aspherical surfaces in the optical system according to Example 2.

FIG. 7 illustrates the curvatures of the aspherical surfaces (first surface, second surface) of the lens L1 and the aspherical surfaces (third surface, fourth surface) of the lens L2 for each radial position. In this example, the first, second, and third surfaces have inflection points, and the second and third surfaces have two inflection points. Although the surfaces having two inflection points are different from those of Example 1, the obtained effect is the same.

Figure 8:
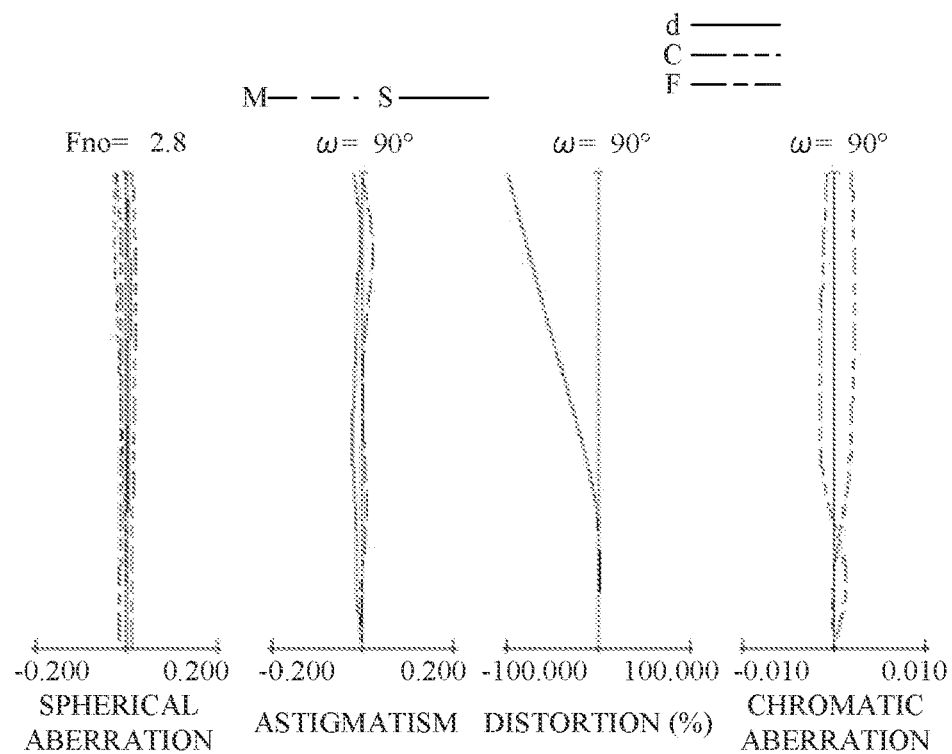
FIG. 8 illustrates aberration diagrams of the optical system according to Example 2.

FIG. 8 illustrates the longitudinal aberration of the optical system 100B according to this example. As understood from this figure, in the optical system 100B according to this example, the spherical aberration, the curvature of field, the astigmatism, and the lateral chromatic aberration are satisfactorily corrected. The distortion is small in the low angle of view area and increases in the high angle of view area as the imaging height increases. The projection characteristic in the low angle of view area is close to y=f×tan θ in order to secure the high resolution.

Table 4 summarizes parameter values in this example (numerical example) and the values of each of the above inequalities (except for the inequality (5)). As understood from Table 4, the optical system 100B according to this example satisfies all of the inequalities. Therefore, the optical system 100B according to this example has a high central resolution, a wide angle of view equivalent to that of the fisheye lens, and a good optical performance.

Example 3

Figure 9:
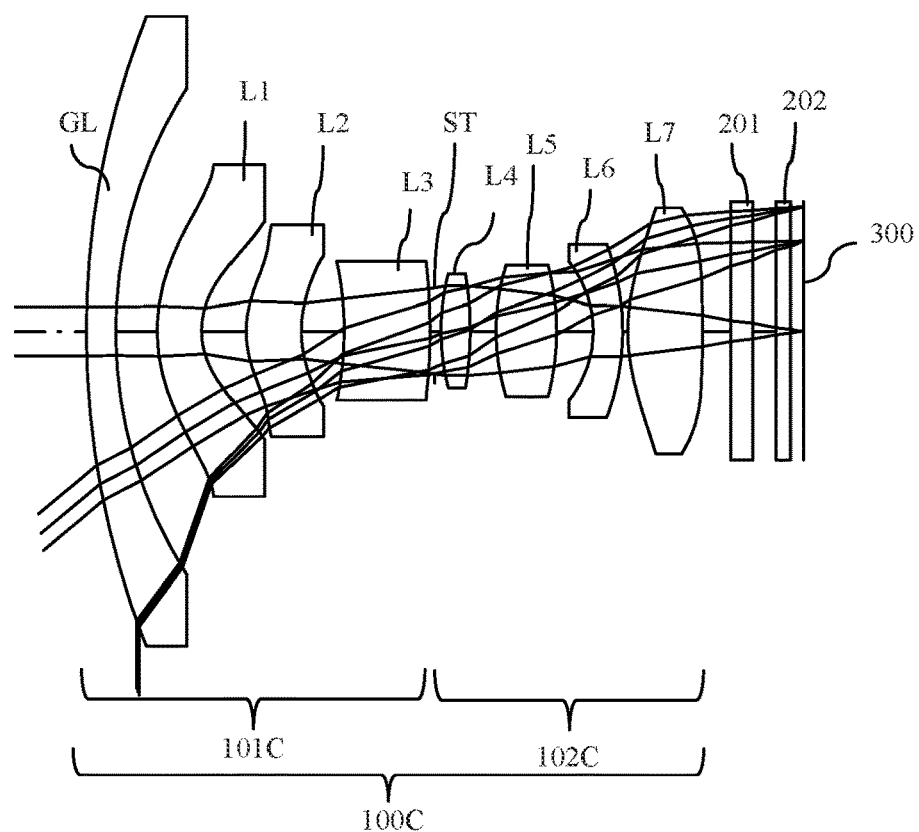
FIG. 9 is a sectional view of an optical system according to Example 3.

The optical system 100C according to Example 3 illustrated in FIG. 9 is different from that of each of Examples 1 and 2 in that the front unit 100C includes a cover glass lens GL closest to the enlargement conjugate position and three lenses L1 to L3. The cover glass lens GL serves as a cover glass for protecting the lens L1 and a lens having a refractive power. Therefore, without the cover glass lens GL, the optical performance of the optical system 100C cannot be secured. The cover glass lens GL is designed to be insensitive to the arrangement errors so that it can be easily replaced if it gets damaged or scratched.

The lens L1 is an aspherical lens (first aspherical lens) including aspherical surfaces on both sides, and has a negative paraxial refractive power. The lens L2 is an aspherical lens (second aspherical lens) having aspherical surfaces on both sides, and has a positive paraxial refractive power. The lens L3 is a spherical lens and has a negative refractive power.

The rear unit 102C includes four lenses L4 to L7. The lenses L4, L5, and L6 are spherical lenses, and have positive, positive, and negative refractive powers, respectively. The lens L7 as the final lens is an aspherical lens (third aspherical lens) with aspherical surfaces on both sides, and has a positive paraxial refractive power. The lens L7 has a positive refractive power in the periphery similar to the lens L8 in Examples 1 and 2.

In this example, the front unit 101C includes four lenses including the cover glass lens GL in order to suppress an increase in the overall length of the optical system 100C due to the provision of the cover glass lens GL. Unlike Examples 1 and 2, the lens L3 closest to the reduction conjugate position in the front unit 101C has a negative refractive power, and a convex surface facing the reduction conjugate side similar to Examples 1 and 2, satisfactorily correcting the coma.

Table 5 summarizes a numerical example of the optical system 100C according to this example. The optical system 100C according to this example is an optical system having a maximum half angle of view $\theta_{max}$ of $\pi/2$, which has a maximum half angle of view equivalent to that of the fisheye lens.

Figure 10B:
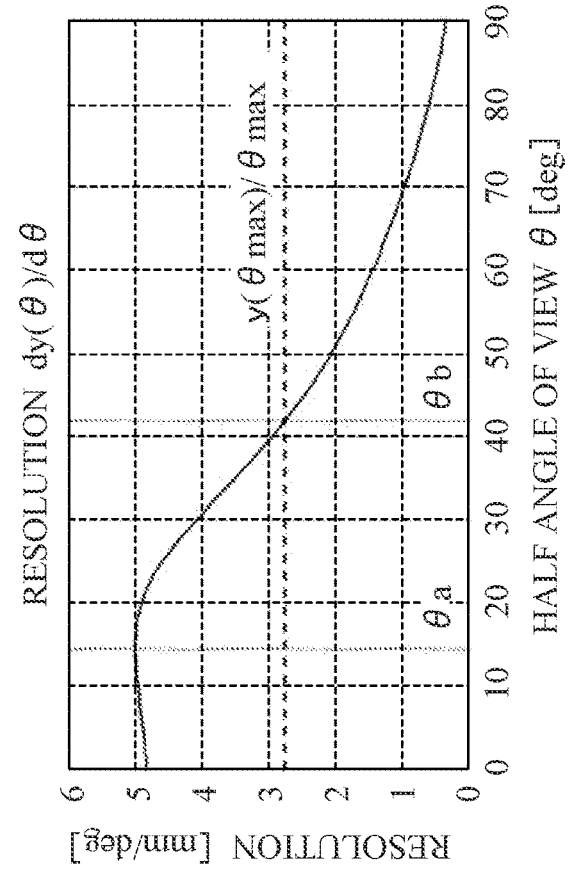
FIGS. 10A and 10B illustrate projection characteristics of the optical system according to Example 3.
Figure 10A:
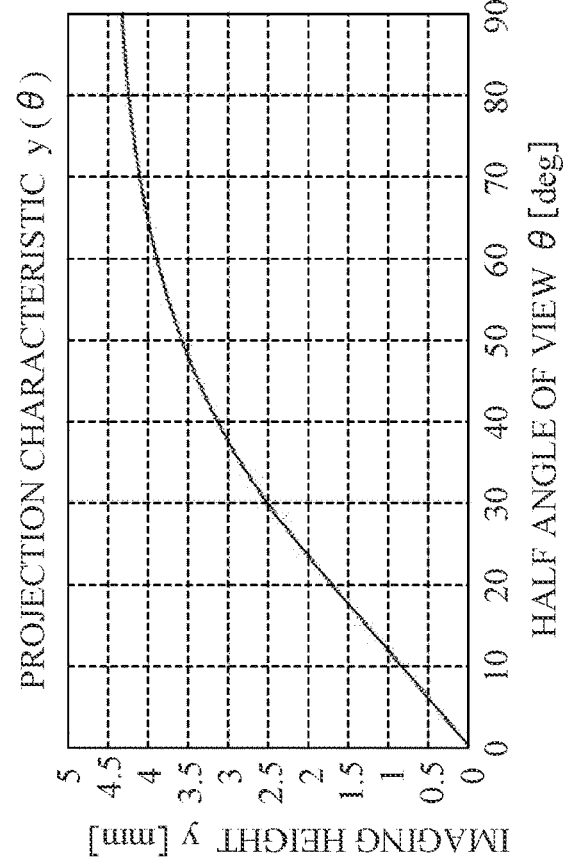

FIGS. 10A and 10B illustrate the projection characteristic and the resolution characteristic of the optical system 100C according to this example, respectively. As understood from these figures, the optical system 100C according to this example has a wide angle of view equivalent to that of the fisheye lens, and a higher central resolution than that of fisheye lens.

Figure 11:
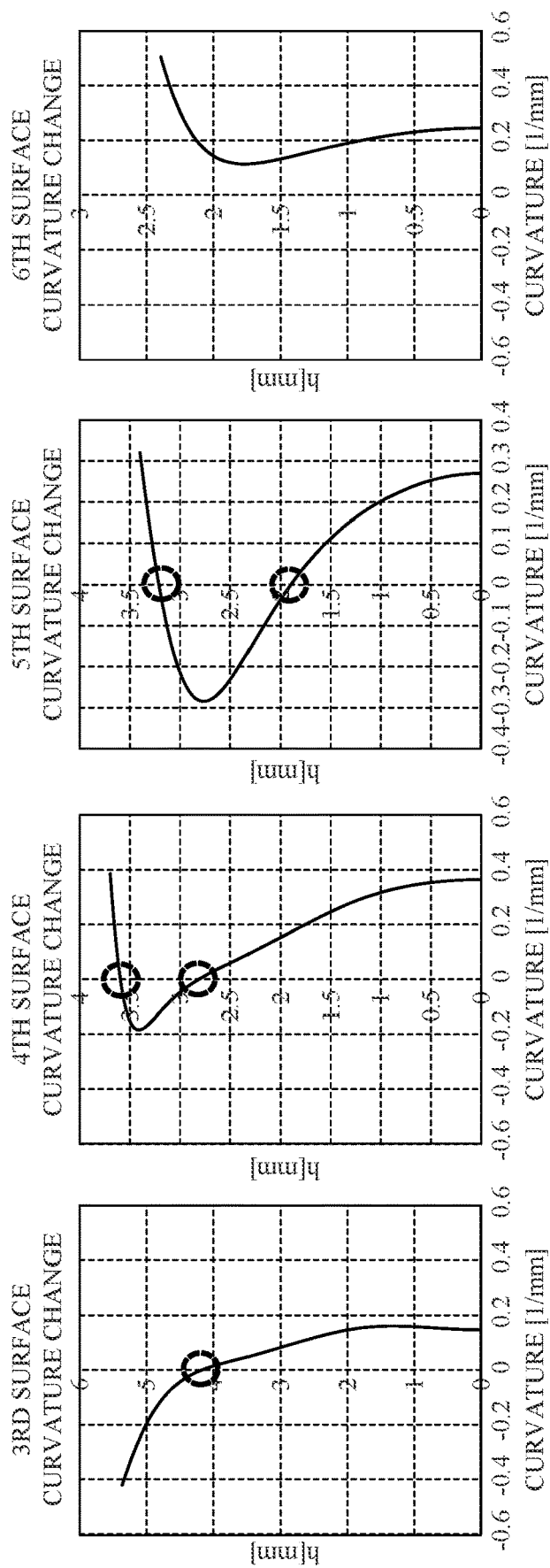
FIG. 11 illustrates curvatures of aspherical surfaces in the optical system according to Example 3.

FIG. 11 illustrates the curvatures of the aspherical surfaces (third surface, fourth surface) of the lens L1 and the aspherical surfaces (fifth surface, sixth surface) of the lens L2 for each radial position. In this example, the third, fourth, and fifth surfaces have inflection points, and the fourth and fifth surfaces have two inflection points. Although the surfaces having two inflection points are different from those of Example 1, the obtained effect is the same.

Figure 12:
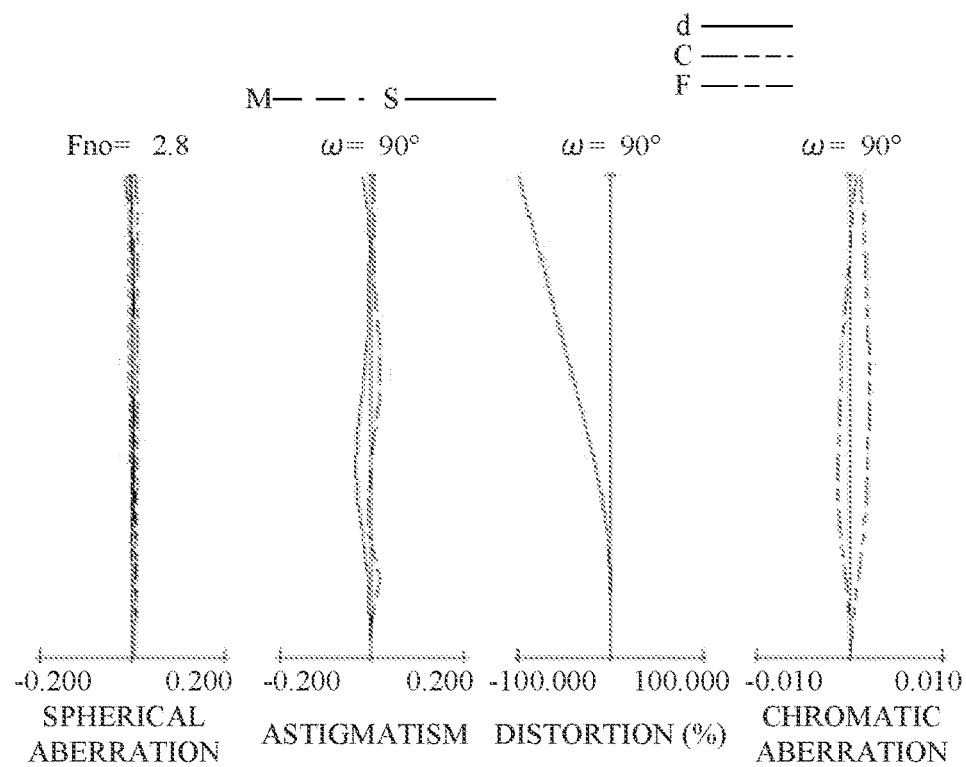
FIG. 12 illustrates aberration diagrams of the optical system according to Example 3.

FIG. 12 illustrates the longitudinal aberration of the optical system 100C according to this example. As understood from this figure, in the optical system 100C according to this example, the spherical aberration, the curvature of field, the astigmatism, and the lateral chromatic aberration are satisfactorily corrected. The distortion is small in the low angle of view area and increases in the high angle of view area as the imaging height increases. The projection characteristic in the low angle of view area is close to $y=f \times \tan \theta$ in order to secure the high resolution.

Table 6 summarizes parameter values in this example (numerical example) and the values of each of the above inequalities (except for the inequality (5)). As understood from Table 6, the optical system 100C according to this example satisfies all of the inequalities. Therefore, the optical system 100C according to this example has a high central resolution, a wide angle of view equivalent to that of the fisheye lens, and a good optical performance.

Example 4

Figure 13:
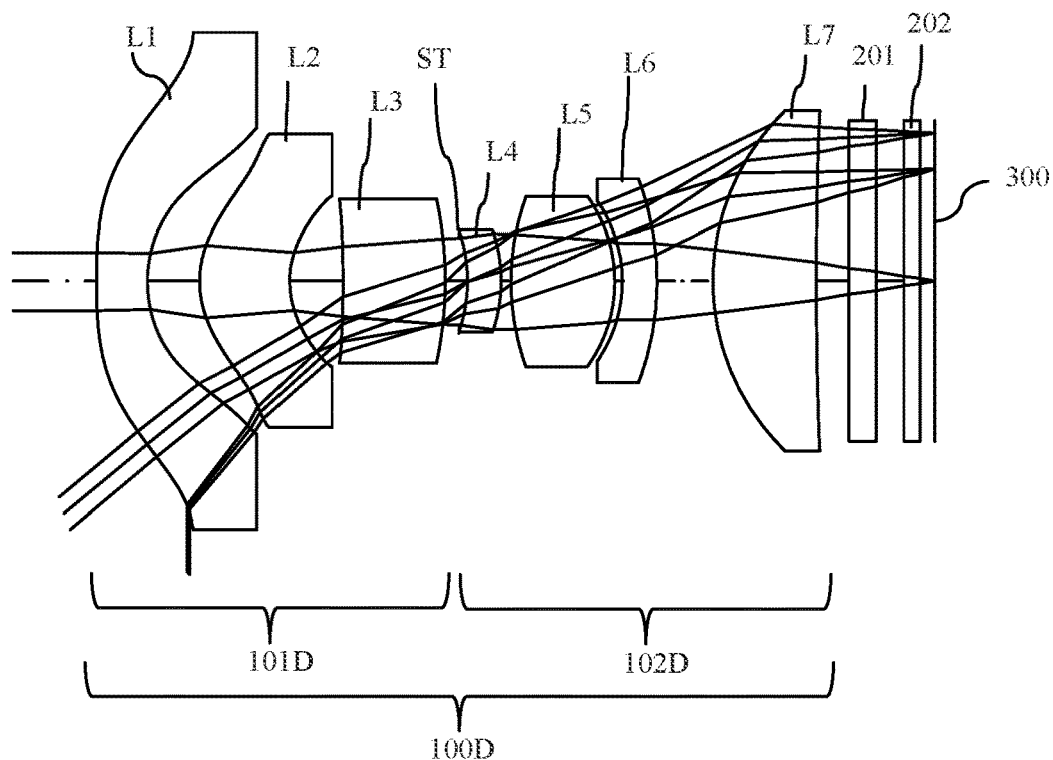
FIG. 13 is a sectional view of an optical system according to Example 4.

The optical system 100D according to Example 4 illustrated in FIG. 13 is different from the other examples in having no third aspherical lens and the spherical lens L7 disposed closest to the reduction conjugate position in the rear unit 102D.

The front unit 101D includes three lenses L1 to L3. The lens L1 is an aspherical lens (first aspherical lens) having aspherical surfaces on both sides, and has a negative paraxial refractive power. The lens L2 is an aspherical lens (second aspherical lens) having aspherical surfaces on both sides, and has a positive paraxial refractive power. The lens L3 is a spherical lens and has a positive refractive power.

The rear unit 102D includes four lenses L4 to L7. The lenses L4 to L7 are spherical lenses, and have positive, positive, negative, and positive refractive powers. In this example, the front unit 101D includes three lenses, and the spherical lens (final lens) L7 having a positive refractive power is disposed in the rear unit 102D instead of the third aspherical lens.

The lens L7 as the spherical lens has a positive refractive power even in the periphery. This lens L7 may be provided in order to reduce the incident angle of the light ray on the image plane 300 in the high angle of view area and to obtain a high central resolution and a wide angle of view equivalent to that of the fisheye lens.

The lens L3 closest to the reduction conjugate position in the front unit 101D has a convex surface facing the reduction conjugate side, satisfactorily correcting the coma similar to the other examples.

Table 7 summarizes a numerical example of the optical system 100D according to this example. The optical system 100D according to this example is an optical system having a maximum half angle of view $\theta_{max}$ of $\pi/2$, which has a maximum half angle of view equivalent to that of the fisheye lens.

Figure 14B:
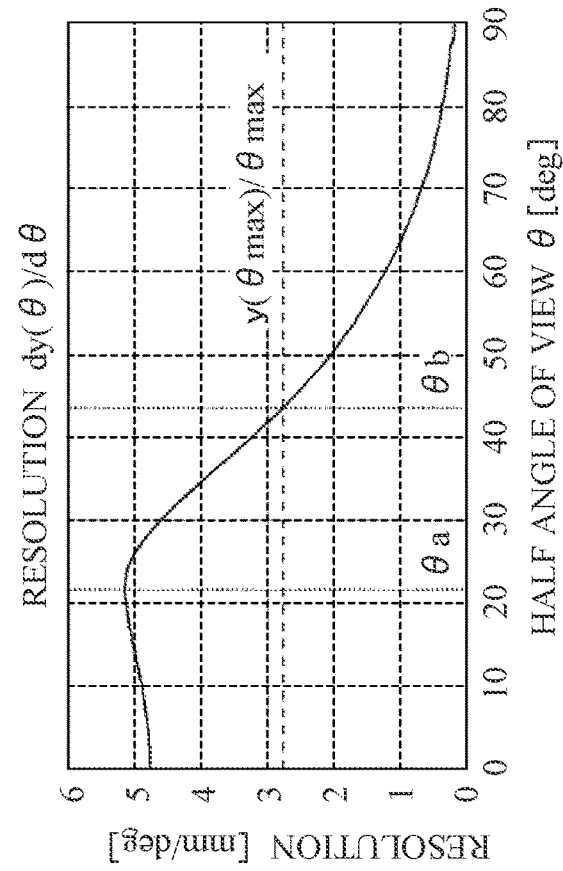
FIGS. 14A and 14B illustrate projection characteristics of the optical system according to Example 4.
Figure 14A:
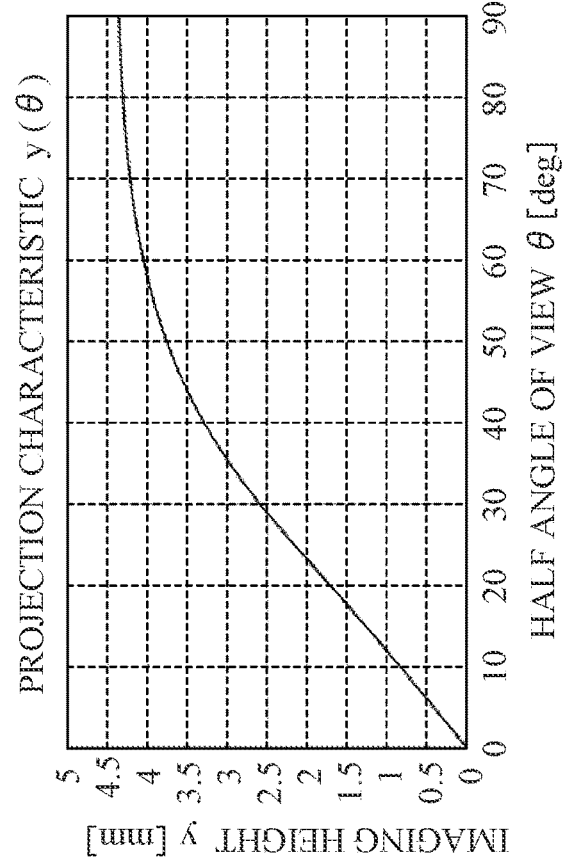

FIGS. 14A and 14B illustrate the projection characteristic and the resolution characteristic of the optical system 100D according to this example, respectively. As understood from these figures, the optical system 100D according to this example has a wide angle of view equivalent to that of the fisheye lens, and a higher central resolution than that of the fisheye lens.

Figure 15:
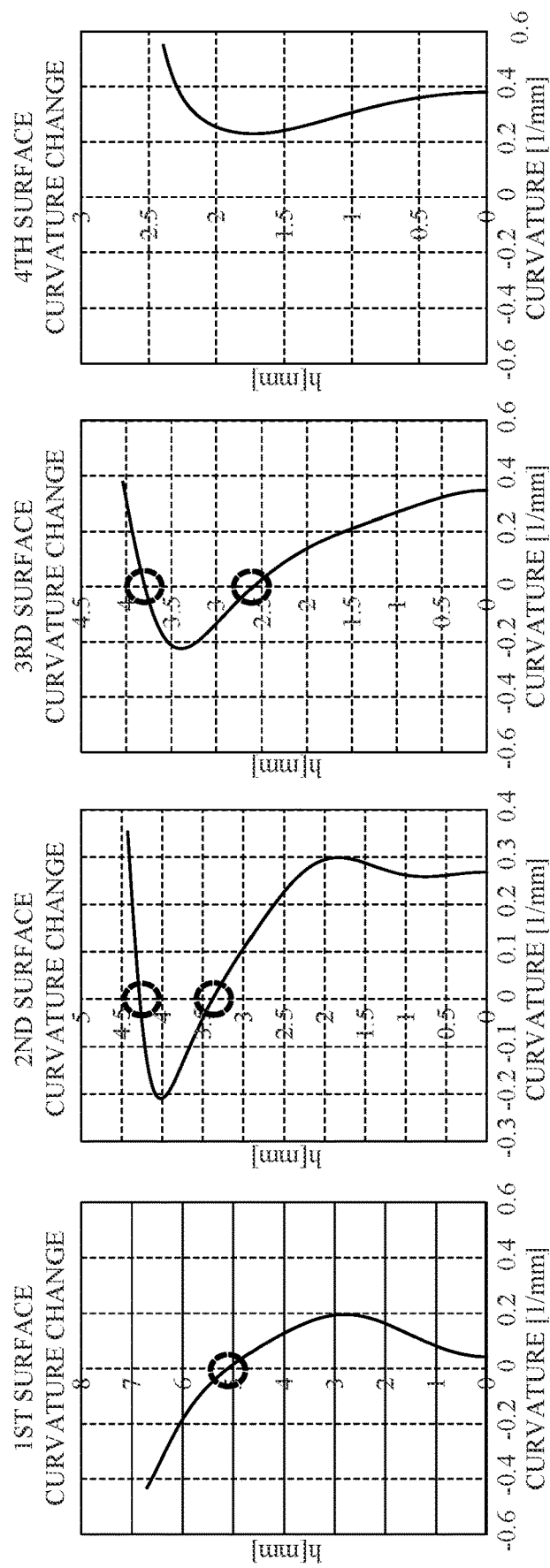
FIG. 15 illustrates curvatures of aspherical surfaces in the optical system according to Example 4.

FIG. 15 illustrates the curvatures of the aspherical surfaces (first surface, second surface) of the lens L1 and the aspherical surfaces (third surface, fourth surface) of the lens L2 for each radial position. In this example, the first, second, and third surfaces have inflection points, and the second and third surfaces have two inflection points. Although the surfaces having two inflection points are different from those of Example 1, the obtained effect is the same.

Figure 16:
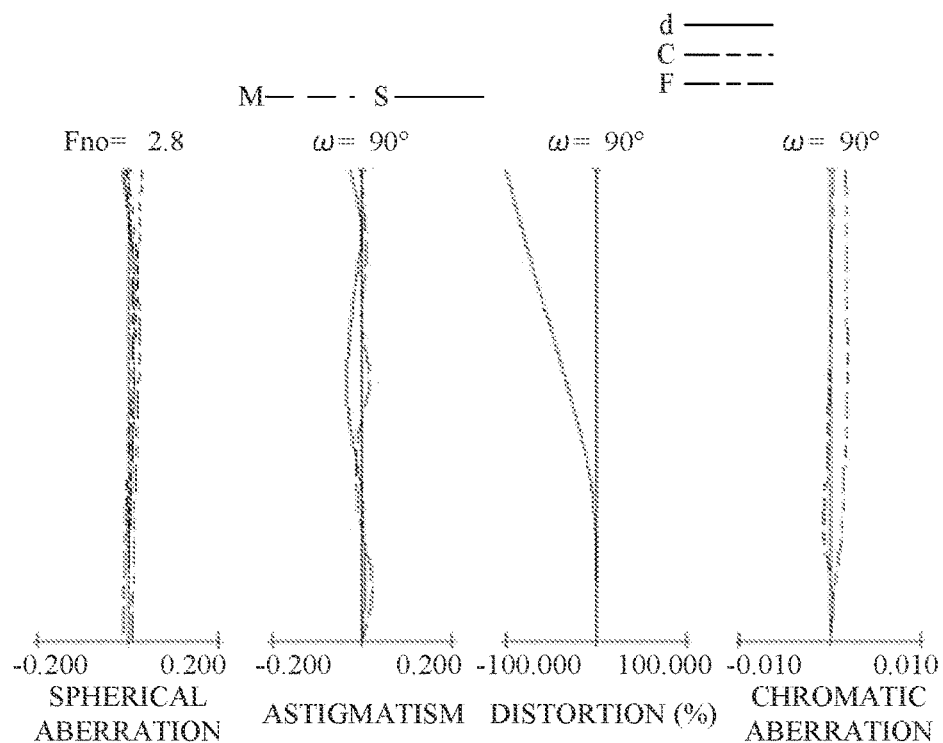
FIG. 16 illustrates aberration diagrams of the optical system according to Example 4.

FIG. 16 illustrates the longitudinal aberration of the optical system 100D according to this example. As understood from this figure, in the optical system 100D according to this example, the spherical aberration, the curvature of field, the astigmatism, and the lateral chromatic aberration are satisfactorily corrected. The distortion is also small in the low angle of view area and increases in the high angle of view area as the imaging height increases. The projection characteristic in the low angle of view area is close to $y=f \times \tan \theta$ in order to secure the high resolution.

Table 8 summarizes parameter values in this example (numerical example) and the values of each of the above inequalities (except for the inequality (5)). As understood from Table 8, the optical system 100D according to this example satisfies all of the inequalities. Therefore, the optical system 100D according to this example has a high central resolution, a wide angle of view equivalent to that of the fisheye lens, and a good optical performance

TABLE 1

(A)

| | | |
|---|---|---|
| f | | 4.500 |
| Fno | | 2.80 |
| θ max | | 90.00 |

| | Surface No. | Paraxial Radius of Curvature r [mm] | Surface Distance d [mm] | Refractive Power n | Abbe Number ν |
|---|---|---|---|---|---|
| ※ | 1 | 673.216 | 1.500 | 1.639 | 55.18 |
| ※ | 2 | 3.891 | 1.910 | — | — |
| ※ | 3 | 3.800 | 1.500 | 1.851 | 40.10 |
| ※ | 4 | 4.102 | 1.520 | — | — |
| | 5 | −9.056 | 1.000 | 1.516 | 64.14 |
| | 6 | −245.041 | 0.570 | — | — |
| | 7 | 8.223 | 2.720 | 1.517 | 52.43 |
| | 8 | −5.729 | 0.860 | — | — |
| ST | 9 | ∞ | 0.880 | — | — |
| | 10 | −28.702 | 1.180 | 1.487 | 70.24 |
| | 11 | −123.859 | 0.400 | — | — |
| | 12 | 9.674 | 2.730 | 1.691 | 54.82 |
| | 13 | −4.669 | 0.360 | — | — |
| | 14 | −3.624 | 1.000 | 1.946 | 17.98 |
| | 15 | −8.094 | 0.200 | — | — |
| ※ | 16 | 19.772 | 2.830 | 1.583 | 59.46 |
| ※ | 17 | −150.000 | 1.206 | — | — |
| | 18 | ∞ | 0.650 | 1.560 | 56.00 |
| | 19 | ∞ | 1.640 | — | — |
| | 20 | ∞ | 0.300 | 1.500 | 63.00 |
| | 21 | ∞ | 0.040 | — | — |

(B)

| | Surface No. | | | | | |
|---|---|---|---|---|---|---|
| | 1 | 2 | 3 | 4 | 16 | 17 |
| r | 673.216 | 3.891 | 3.800 | 4.102 | 19.772 | −150.000 |
| k | 0.00000 | −2.12236 | −1.76657 | −0.73921 | 0.00000 | 0.00000 |
| B4 | 3.33013E−03 | −2.66398E−03 | −9.36149E−03 | −1.04629E−02 | −1.92717E−03 | −3.80749E−03 |
| B6 | −1.25131E−04 | 1.10594E−03 | 1.91415E−04 | 1.30994E−03 | −5.43966E−05 | −4.81998E−04 |
| B8 | 2.08087E−06 | −1.35740E−04 | 2.76873E−05 | −1.29304E−04 | 9.61424E−06 | 6.83424E−05 |
| B10 | −1.87333E−08 | 7.22769E−06 | −1.72835E−06 | 3.20614E−05 | −6.17775E−08 | −4.20387E−06 |
| B12 | 1.11670E−10 | −1.83743E−07 | 2.77976E−08 | −4.70351E−06 | −4.26187E−09 | 1.38448E−07 |
| B14 | −4.14149E−13 | 1.85358E−09 | 0.00000E+00 | 4.45939E−07 | 0.00000E+00 | −1.73331E−09 |
| B16 | 0.00000E+00 | 0.00000E+00 | 0.00000E+00 | −1.83202E−08 | 0.00000E+00 | 0.00000E+00 |

TABLE 2

| Parameter | Value |
|---|---|
| f | 4.500 |
| θ max | 1.571 |
| θ a | 0.262 |
| θ b | 0.664 |
| y (θ max) | 3.650 |
| d y (θ)/d θ $|_{θ=θ\,max}$ | 0.433 |
| $n_1$ | 1.639 |
| $n_2$ | 1.851 |
| fa | 14.431 |
| D | 9.580 |

TABLE 2-continued

| Parameter | Value |
|---|---|
| L | 21.160 |
| f × sin θ max/y (θ max) | 1.233 |
| θ max/π | 0.500 |
| θ a/θ max | 0.167 |
| θ b/θ max | 0.422 |
| (d y (θ)/d θ $|_{θ=θ\,max}$)/f | 0.096 |
| $n_1$/1.6 | 1.024 |
| $n_2$/$n_1$ | 1.130 |
| |f/fa| | 0.312 |
| D/L | 0.453 |

TABLE 3

(A)

|  |  | f |  | 4.867 |  |
|---|---|---|---|---|---|
|  |  | Fno |  | 2.80 |  |
|  |  | θ max |  | 90.00 |  |

|  | Surface No. | Paraxial Radius of Curvature r [mm] | Surface Distance d [mm] | Refractive Power n | Abbe Number ν |
|---|---|---|---|---|---|
| ※ | 1 | 8.491 | 1.500 | 1.639 | 55.18 |
| ※ | 2 | 2.416 | 1.715 | — | — |
| ※ | 3 | 3.200 | 1.518 | 1.851 | 40.10 |
| ※ | 4 | 4.052 | 1.255 | — | — |
|  | 5 | −34.666 | 2.500 | 1.654 | 39.68 |
|  | 6 | 9.036 | 0.232 | — | — |
|  | 7 | 696.856 | 1.879 | 1.883 | 40.81 |
|  | 8 | −14.322 | 0.484 | — | — |
| ST | 9 | ∞ | 0.200 | — | — |
|  | 10 | 14.748 | 1.894 | 1.583 | 59.37 |
|  | 11 | −5.566 | 0.200 | — | — |
|  | 12 | 9.849 | 2.712 | 1.516 | 64.14 |
|  | 13 | −11.000 | 0.200 | — | — |
|  | 14 | −7.000 | 1.000 | 1.855 | 24.80 |
|  | 15 | 16.551 | 0.200 | — | — |
| ※ | 16 | 7.835 | 3.428 | 1.583 | 59.46 |
| ※ | 17 | −11.643 | 1.635 | — | — |
|  | 18 | ∞ | 0.900 | 1.560 | 56.00 |
|  | 19 | ∞ | 0.550 | — | — |
|  | 20 | ∞ | 0.800 | 1.517 | 64.17 |
|  | 21 | ∞ | 0.200 | — | — |

(B)

| | Surface No. | | | | | |
|---|---|---|---|---|---|---|
| | 1 | 2 | 3 | 4 | 16 | 17 |
| r | 8.491 | 2.416 | 3.200 | 4.052 | 7.835 | −11.643 |
| k | 0.00000 | −2.88107 | −1.10652 | −0.29446 | −1.84211 | −32.91100 |
| B4 | 1.97947E−03 | 1.91580E−02 | −6.50950E−04 | −1.01493E−03 | −7.77882E−04 | −1.57331E−03 |
| B6 | −1.87497E−04 | −1.88903E−03 | 1.92553E−04 | 4.26202E−04 | 2.73724E−05 | −1.57782E−04 |
| B8 | 5.60779E−06 | 6.15352E−05 | −1.53464E−04 | −5.16259E−04 | 1.23280E−06 | 1.27170E−05 |
| B10 | −8.06786E−08 | −5.09266E−07 | 1.27757E−05 | 1.27780E−04 | −9.23138E−08 | −5.84745E−08 |
| B12 | 4.43120E−10 | −4.59904E−09 | −3.08003E−07 | −1.47735E−05 | 0.00000E+00 | −1.94889E−08 |
| B14 | 0.00000E+00 | 0.00000E+00 | 0.00000E+00 | 8.05423E−07 | 0.00000E+00 | 4.72725E−10 |
| B16 | 0.00000E+00 | 0.00000E+00 | 0.00000E+00 | −1.23269E−08 | 0.00000E+00 | 0.00000E+00 |

TABLE 4

| Parameter | Value |
|---|---|
| f | 4.867 |
| θ max | 1.571 |
| θ a | 0.305 |
| θ b | 0.722 |
| y (θ max) | 4.365 |
| d y (θ)/d θ \|$_{θ=θ\ max}$ | 0.172 |
| $n_1$ | 1.639 |
| $n_2$ | 1.851 |
| fa | −10.398 |
| D | 9.833 |
| L | 20.915 |

TABLE 4-continued

| Parameter | Value |
|---|---|
| f × sin θ max/y (θ max) | 1.115 |
| θ max/π | 0.500 |
| θ a/θ max | 0.194 |
| θ b/θ max | 0.460 |
| (d y (θ)/d θ \|$_{θ=θ\ max}$)/f | 0.035 |
| $n_1$/1.6 | 1.024 |
| $n_2$/$n_1$ | 1.130 |
| \|f/fa\| | 0.468 |
| D/L | 0.470 |

TABLE 5

(A)

|  |  | f |  | 4.853 |  |
|---|---|---|---|---|---|
|  |  | Fno |  | 2.80 |  |
|  |  | θ max |  | 90.00 |  |

| Surface No. | Paraxial Radius of Curvature r [mm] | Surface Distance d [mm] | Refractive Power n | Abbe Number ν |
|---|---|---|---|---|
| 1 | 30.00 | 1.000 | 1.703 | 52.38 |
| 2 | 15.595 | 1.500 | — | — |

TABLE 5-continued (A)

|   | | | | | |
|---|---|---|---|---|---|
| ※ | 3 | 6.833 | 1.500 | 1.808 | 40.55 |
| ※ | 4 | 2.745 | 1.558 | — | — |
| ※ | 5 | 3.700 | 1.941 | 1.832 | 40.10 |
| ※ | 6 | 4.100 | 1.474 | — | — |
|   | 7 | −11.809 | 3.000 | 1.855 | 24.80 |
|   | 8 | −26.847 | 0.200 | — | — |
| ST | 9 | ∞ | 0.200 | — | — |
|   | 10 | 7.794 | 1.000 | 1.734 | 51.47 |
|   | 11 | −12.431 | 0.922 | — | — |
|   | 12 | 8.061 | 2.098 | 1.487 | 70.24 |
|   | 13 | −8.436 | 1.296 | — | — |
|   | 14 | −3.734 | 1.000 | 1.946 | 17.98 |
|   | 15 | −8.428 | 0.200 | — | — |
| ※ | 16 | 6.753 | 2.612 | 1.487 | 70.24 |
| ※ | 17 | −50.000 | 0.960 | — | — |
|   | 18 | ∞ | 0.800 | 1.516 | 64.14 |
|   | 19 | ∞ | 0.800 | — | — |
|   | 20 | ∞ | 0.500 | 1.516 | 64.14 |
|   | 21 | ∞ | 0.440 | — | — |

(B)

| | Surface No. | | | | | |
|---|---|---|---|---|---|---|
| | 3 | 4 | 5 | 6 | 16 | 17 |
| r | 6.838 | 2.745 | 3.700 | 4.100 | 6.753 | −50.000 |
| k | 0.00000 | −3.91447 | −1.38194 | 0.76082 | 0.00000 | 0.00000 |
| B4 | 1.38270E−03 | 1.97522E−02 | −2.61681E−03 | −6.18885E−03 | −1.65054E−03 | 1.40271E−03 |
| B6 | −1.66387E−04 | −3.05346E−03 | −8.68195E−05 | −3.06588E−04 | 0.00000E+00 | −5.75637E−04 |
| B8 | 4.18076E−06 | 3.70321E−04 | −7.05235E−05 | −6.38418E−06 | 0.00000E+00 | 4.96769E−05 |
| B10 | 2.63823E−08 | −4.24848E−05 | 7.37728E−06 | −1.69362E−07 | 0.00000E+00 | −2.59682E−06 |
| B12 | −3.56383E−09 | 3.65067E−06 | −1.79414E−07 | 7.19174E−07 | 0.00000E+00 | 7.89420E−08 |
| B14 | 4.48054E−11 | −1.85041E−07 | 0.00000E+00 | 0.00000E+00 | 0.00000E+00 | −1.01998E−09 |
| B16 | 0.00000E+00 | 3.96447E−09 | 0.00000E+00 | 0.00000E+00 | 0.00000E+00 | 0.00000E+00 |

TABLE 6

| Parameter | Value |
|---|---|
| f | 4.853 |
| θ max | 1.57 |
| θ a | 0.253 |
| θ b | 0.732 |
| y (θ max) | 4.345 |
| d y (θ)/d θ $\vert_{θ=θ\ max}$ | 0.361 |
| $n_1$ | 1.703 |
| $n_2$ | 1.808 |
| fa | −5.880 |
| D | 9.328 |
| L | 21.500 |

TABLE 6-continued

| Parameter | Value |
|---|---|
| f × sin θ max/y (θ max) | 1.117 |
| θ max/π | 0.500 |
| θ a/θ max | 0.161 |
| θ b/θ max | 0.466 |
| (d y (θ)/d θ $\vert_{θ=θ\ max}$)/f | 0.074 |
| $n_1$/1.6 | 1.064 |
| $n_2/n_1$ | 1.062 |
| \|f/fa\| | 0.825 |
| D/L | 0.434 |

TABLE 7

(A)

| | | | f | 4.780 | |
|---|---|---|---|---|---|
| | | | Fno | 2.80 | |
| | | | θ max | 90.00 | |

| | Surface No. | Paraxial Radius of Curvature r [mm] | Surface Distance d [mm] | Refractive Power n | Abbe Number ν |
|---|---|---|---|---|---|
| ※ | 1 | 23.303 | 1.500 | 1.808 | 40.55 |
| ※ | 2 | 3.727 | 1.540 | — | — |
| ※ | 3 | 2.882 | 2.603 | 1.832 | 40.10 |
| ※ | 4 | 2.632 | 0.739 | — | — |
|   | 5 | 6.521 | 0.212 | — | — |
|   | 6 | 6.167 | 0.630 | — | — |
|   | 7 | −31.172 | 3.000 | 1.855 | 24.80 |
|   | 8 | −10.600 | 0.389 | — | — |
| ST | 9 | ∞ | 0.251 | — | — |
|   | 10 | −4.921 | 1.000 | 1.734 | 51.47 |
|   | 11 | −4.213 | 0.294 | — | — |

TABLE 7-continued (A)

| | | | | |
|---|---|---|---|---|
| 12 | 7.278 | 3.026 | 1.487 | 70.24 |
| 13 | −4.202 | 0.236 | — | — |
| 14 | −4.157 | 1.013 | 1.946 | 17.98 |
| 15 | −8.397 | 1.644 | — | — |
| 16 | 6.971 | 3.004 | 1.487 | 70.24 |
| 17 | 98.484 | 0.960 | — | — |
| 18 | ∞ | 0.800 | 1.516 | 64.14 |
| 19 | ∞ | 0.800 | — | — |
| 20 | ∞ | 0.500 | 1.516 | 64.14 |
| 21 | ∞ | 0.442 | — | — |

(B)

| | Surface No. | | | |
|---|---|---|---|---|
| | 1 | 2 | 3 | 4 |
| r | 23.303 | 3.727 | 2.882 | 2.632 |
| k | 0.00000 | −4.31960 | −1.12900 | −0.04272 |
| B4 | 3.49264E−03 | 7.26236E−03 | −3.42118E−03 | −6.84252E−03 |
| B6 | −9.05302E−05 | 4.01190E−04 | 6.95422E−04 | −3.03731E−04 |
| B8 | 1.11937E−06 | −3.77016E−05 | −1.03037E−04 | −2.63994E−04 |
| B10 | −1.31596E−08 | −2.61372E−07 | 5.02151E−06 | 6.07571E−05 |
| B12 | 9.03253E−11 | 3.66293E−08 | −7.57897E−08 | −5.49640E−06 |
| B14 | 0.00000E+00 | 0.00000E+00 | 0.00000E+00 | 0.00000E+00 |
| B16 | 0.00000E+00 | 0.00000E+00 | 0.00000E+00 | 0.00000E+00 |

TABLE 8

| Parameter | Value |
|---|---|
| f | 4.780 |
| θ max | 1.57 |
| θ a | 0.375 |
| θ b | 0.759 |
| y (θ max) | 4.361 |
| d y (θ)/d θ $|_{\theta-\theta\ max}$ | 0.189 |
| $n_1$ | 1.808 |
| $n_2$ | 1.832 |
| fa | −22.751 |
| D | 10.468 |
| L | 21.081 |
| f × sin θ max/y (θ max) | 1.096 |
| θ max/π | 0.500 |
| θ a/θ max | 0.239 |
| θ b/θ max | 0.483 |
| (d y (θ)/d θ $|_{\theta-\theta\ max}$)/f | 0.040 |
| $n_1$/1.6 | 1.130 |
| $n_2$/$n_1$ | 1.013 |
| |f/fa| | 0.210 |
| D/L | 0.497 |

FIG. 15 illustrates a configuration of an in-vehicle camera 10 using the optical system according to any one of the above examples for an imaging optical system, and an in-vehicle system (driving support device) 600 having the same. The in-vehicle system 600 is a system held by a moving body (moving apparatus) that is movable such as an automobile (vehicle), and configured to support driving (steering) of the vehicle based on image information around the vehicle acquired by the in-vehicle camera 10.

FIG. 16 illustrates a vehicle 700 as a moving apparatus that includes the in-vehicle system 600. While FIG. 16 illustrates an imaging range 50 of the in-vehicle camera 10 set to the front of the vehicle 700, the imaging range 50 may be set to the rear or side of the vehicle 700.

As illustrated in FIG. 16, the in-vehicle system 600 includes the in-vehicle camera 10, a vehicle information acquiring apparatus 20, a control apparatus (controller, ECU: electronic control unit) 30, and a warning apparatus (warning unit) 40. The in-vehicle camera 10 includes an imaging unit 1, an image processor 2, a parallax calculator 3, a distance acquirer 4, and a collision determiner 5. The image processor 2, the parallax calculator 3, the distance acquirer 4, and the collision determiner 5 constitute a processing unit. The imaging unit 1 includes the optical system according to any one of the above examples and an image sensor.

Figure 17:
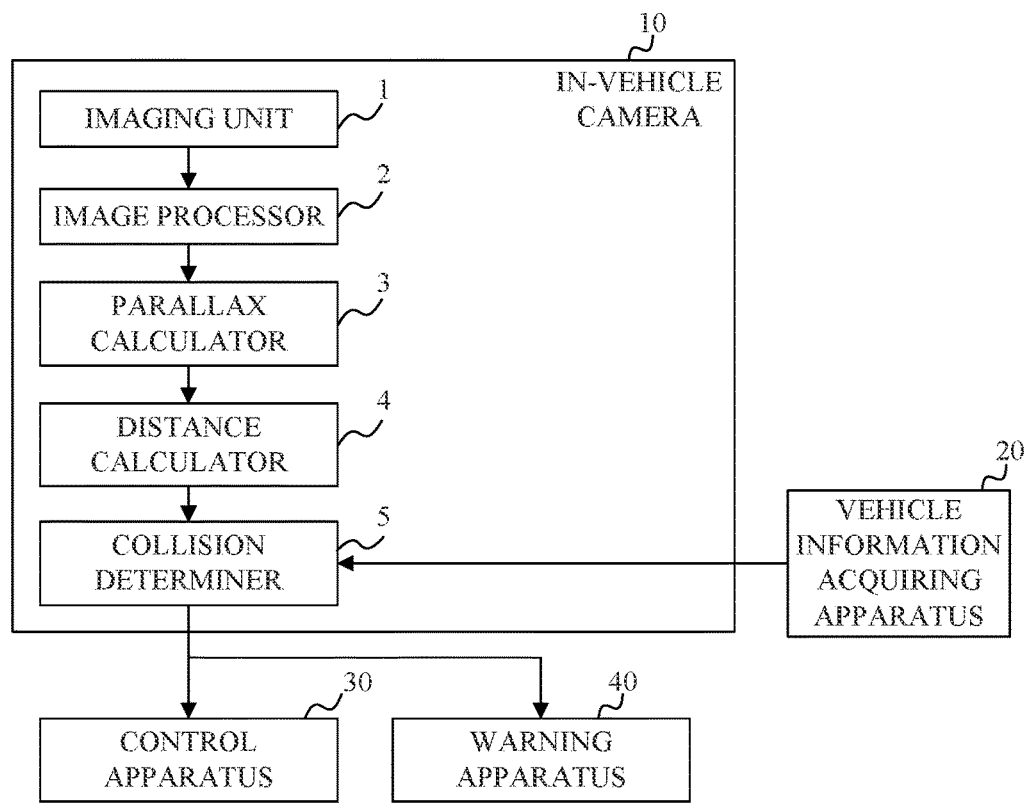
FIG. 17 is a block diagram of an in-vehicle system using the optical system according to each example.
Figure 18:
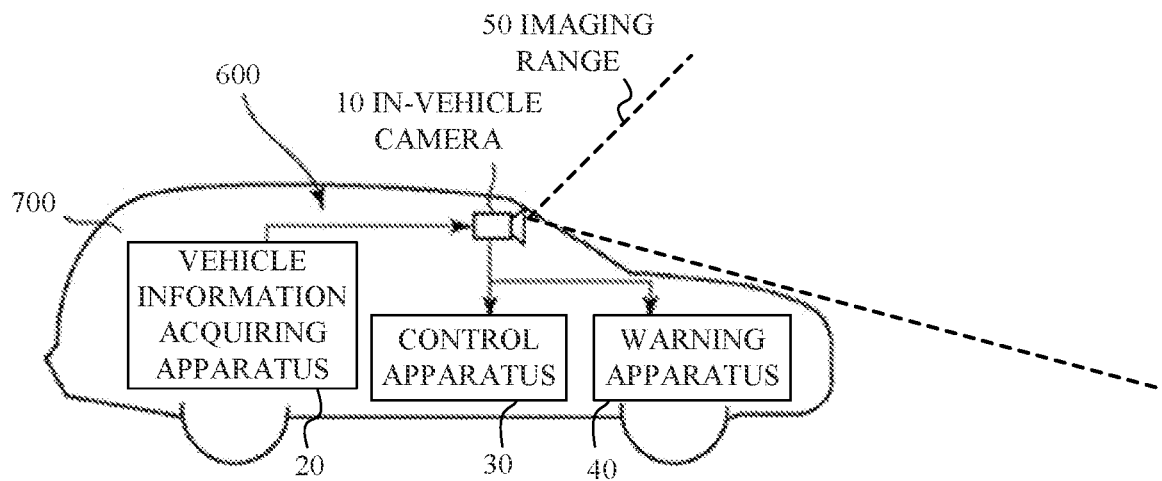
FIG. 18 is a schematic view of principal part of a vehicle including the in-vehicle system.
Figure 19:
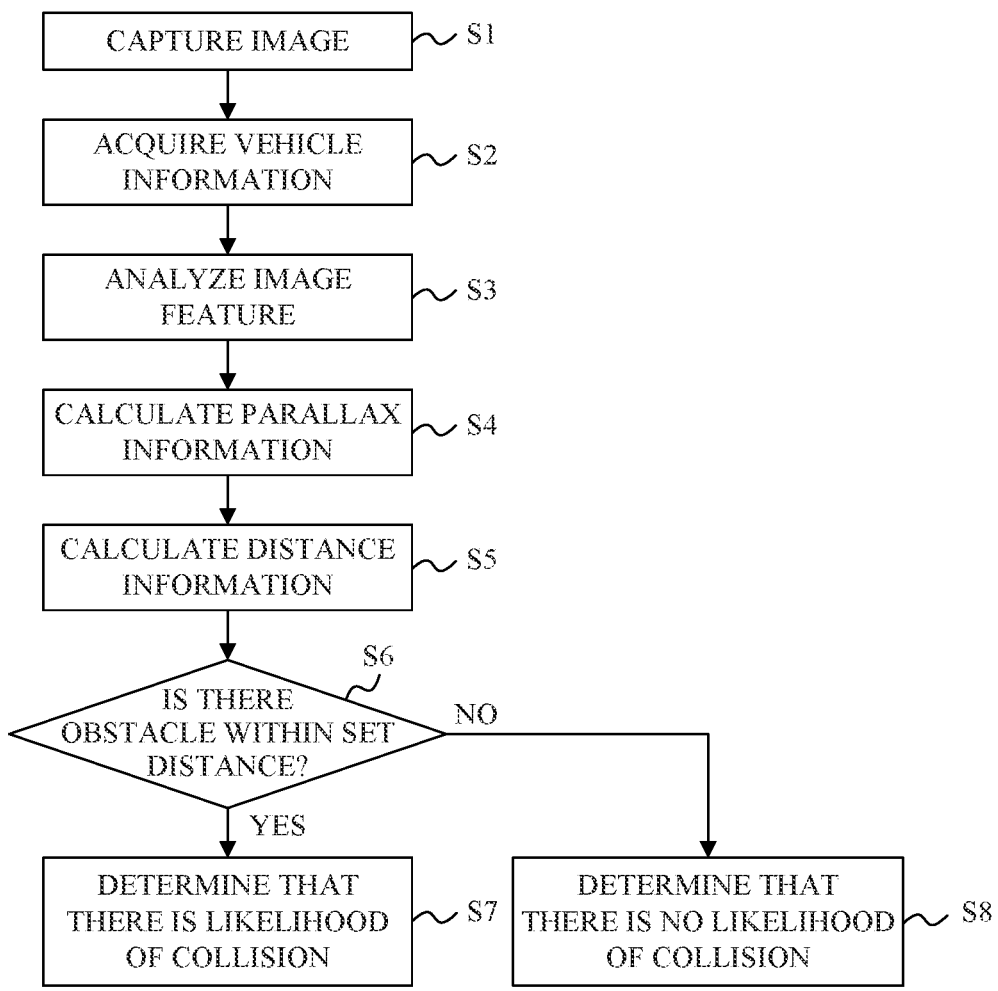
FIG. 19 is a flowchart showing an operation example of the in-vehicle system.

A flowchart of FIG. 17 illustrates an operation example of the in-vehicle system 600. In the step S1, the in-vehicle system 600 images, using the imaging unit 1, an object such as an obstacle or a pedestrian around the vehicle, and acquires a plurality of image data (parallax image data).

In the step S2, vehicle information is acquired by the vehicle information acquiring apparatus 20. The vehicle information is information including a vehicle speed, a yaw rate, a steering angle, and the like of the vehicle.

In the step S3, the image processor 2 performs image processing for the plurality of image data acquired by the imaging unit 1. More specifically, the image feature analysis is performed to analyze a feature amount such as an edge amount, an edge direction, and a density value in image data. The image feature analysis may be performed for each of the plurality of image data, or may be performed only for part of the plurality of image data.

In the step S4, the parallax calculator 3 calculates the parallax (image shift) information between the plurality of image data acquired by the imaging unit 1. A method for calculating the parallax information can use a known method such as the SSDA method or the area correlation method, and a description thereof will be omitted. The steps S2, S3, and S4 may be performed in this order, or may be processed in parallel.

In the step S5, the distance acquirer 4 acquires (calculates) the distance information with the object imaged by the imaging unit 1. The distance information can be calculated based on the parallax information calculated by the parallax calculator 3 and the internal parameters and external parameters of the imaging unit 1. The distance information is information on a relative position with the object such as a distance from the object, a defocus amount, an image shift amount, etc., and may directly represent the distance value of the object in the image or indirectly represent information corresponding to the distance value.

Then, in the step S6, the collision determiner 5 determines whether or not the distance to the object is included in the preset distance range using the vehicle information acquired by the vehicle information acquiring apparatus 20 or the distance information calculated by the distance acquirer 4. This configuration can determine whether or not the object exists within the set distance around the vehicle, and determine a likelihood of collision between the vehicle and the object. The collision determiner 5 determines that "there is a likelihood of collision" (step 7) when the object exists within the set distance, and determines that there is no likelihood of collision (step 8) when the object does not exist within the set distance.

Next, when the collision determiner 5 determines that "there is a likelihood of collision," the collision determiner 5 notifies (transmits) the determination result to the control apparatus 30 and the warning apparatus 40. At this time, the control apparatus 30 controls the vehicle based on the determination result of the collision determiner 5 (step S6), and the warning apparatus 40 provides warning to the vehicle user (driver, passenger) (step 7) based on the determination result of the collision determiner 5. The notification of the determination result may be made to at least one of the control apparatus 30 and the warning apparatus 40.

The control apparatus 30 can control moving of the vehicle by outputting a control signal to a driving unit (engine, motor, etc.) in the vehicle. For example, the control apparatus 30 generates a control signal for hitting the brakes, returning the gas pedal, turning the steering wheel, and applying the braking force to each wheel in the vehicle, and makes a control over the vehicle to suppress an output of the engine or the motor. The warning apparatus 40 gives a warning to the user, for example, by issuing a warning sound (alert), displaying warning information on a screen of a car navigation system, or giving vibrations to the seat belt or steering wheel.

According to the in-vehicle system 600 described above, the above processing can effectively detect the object and avoid a collision between the vehicle and the object. In particular, by applying the optical system according to any one of the above examples to the in-vehicle system 600, the entire in-vehicle camera 10 can be made smaller with an improved freedom degree of the arrangement, detect the object, and determine the likelihood of collision at a wide angle of view.

Various methods can be used to calculate the distance information. As an example, a pupil dividing type image sensor that includes a plurality of pixel units regularly arranged in a two-dimensional array is used for the image sensor in the imaging unit 1. In the pupil dividing type image sensor, one pixel unit includes a microlens and a plurality of photoelectric conversion units, receives a pair of light beams that have passed through different areas in the pupil of the optical system, and outputs a pair of image data from each photoelectric conversion unit.

An image shift amount of each area is calculated by the correlation calculation between the pair of image data, and the image shift map data representing a distribution of the image shift amount is calculated by the distance acquirer 4. Alternatively, the distance acquirer 4 may further convert the image shift amount into a defocus amount and generate defocus map data representing a distribution of the defocus amount (distribution on the two-dimensional plane of the captured image). The distance acquirer 4 may acquire the distance map data of the distance to the object converted from the defocus amount.

Each of the in-vehicle system 600 and the mobile apparatus 700 may include a notification apparatus (notifier) configured to notify the manufacturer of the in-vehicle system, the seller (dealer) of the moving apparatus, and the like of the fact that the moving apparatus 700 has collided with the obstacle. For example, the notification apparatus can use a device that transmits information (collision information) on a collision between the moving apparatus 700 and the obstacle to a preset external notification destination by e-mail or the like.

Thus, when the collision information is automatically notified by the notification apparatus, measures such as the inspection and repair can be immediately taken after the collision. The notification destination of the collision information may be an arbitrary destination set by the user, such as an insurance company, a medical institution, and the police. The notification apparatus may be configured so as to notify not only the collision information but also the failure information of each component and consumption information of consumables. The presence or absence of the collision may be detected by using the distance information acquired based on the output from the imaging unit 1 described above, or by another detector (sensor).

In this description, the in-vehicle system 600 is applied to a driving support (collision damage reduction), but the present invention is not limited to this example, and the in-vehicle system 600 is applicable to the cruise control (including adaptive cruise control) and automatic driving. The in-vehicle system 600 is applicable not only to a vehicle such as an automobile but also to a moving body such as a ship, an aircraft, or an industrial robot. It is applicable not only to the moving body but also to various devices that utilize an object recognition such as an intelligent transportation system (ITS).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

Each example can provide an optical system that has a sufficient angle of view and a sufficient imaging magnification in a central angle of view area, and makes small an image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-011189, filed on Jan. 27, 2021, which is hereby incorporated by reference herein in its entirety.

What is claimed is:

1. An optical system comprising, in order from an enlargement conjugate side to a reduction conjugate side, a front unit including a plurality of lenses, an aperture stop, and a rear unit including a plurality of lenses,
wherein the rear unit has a positive refractive power,
wherein a projection characteristic $y(\theta)$ of the optical system representing a relationship between a half angle of view $\theta$ and an image height $y$ on an image plane satisfies the following inequality:

$$1 < \frac{f \times \sin\theta_{max}}{y(\theta_{max})} \leq 1.9$$

where $\theta_{max}$ is a maximum half angle of view of the optical system, and $f$ is a focal length of the optical system,
wherein a differential value $dy(\theta)/d\theta$ at the half angle of view $\theta$ of the projection characteristic $y(\theta)$ has a local maximum value, and
wherein the differential value $dy(\theta)/d\theta$ satisfies the following inequality:

$$0.03 \leq \frac{\frac{dy(\theta)}{d\theta}}{f} \leq 0.15$$

at the maximum half angle of view $\theta_{max}$.

2. The optical system according to claim 1, wherein the following inequality is satisfied:

$$0.15 \leq \frac{\theta_a}{\theta_{max}} \leq 0.35$$

where $\theta_a$ is a half angle of view at which the differential value $dy(\theta)/d\theta$ has the local maximum value.

3. The optical system according to claim 1, wherein the following inequality is satisfied:

$$\frac{y(\theta)}{\theta} > f$$

at a half angle of view $\theta$ except for an angle of view of zero which is smaller than a half angle of view $\theta_a$ at which the differential value $dy(\theta)/d\theta$ has the local maximum value.

4. The optical system according to claim 1, wherein the following inequality is satisfied:

$$0.4 \leq \frac{\theta_b}{\theta_{max}} \leq 0.6$$

where $\theta_b$ is a half angle of view at which the differential value $dy(\theta)/d\theta$ satisfies:

$$\frac{dy(\theta)}{d\theta} = \frac{y(\theta_{max})}{\theta_{max}}.$$

5. The optical system according to claim 1, wherein the front unit includes a first aspherical lens.

6. The optical system according to claim 5, wherein the first aspherical lens has a negative paraxial refractive power.

7. The optical system according to claim 5, wherein the following conditional inequality is satisfied:

$$\frac{n_1}{1.6} \geq 1.0$$

where $n_1$ is a refractive index of the first aspherical lens for d-line.

8. The optical system according to claim 5, wherein the front unit includes a second aspherical lens disposed on the reduction conjugate side of the first aspherical lens.

9. The optical system according to claim 8, wherein the second aspherical lens has a meniscus shape with a convex surface facing the enlargement conjugate side.

10. The optical system according to claim 8, wherein the following inequality is satisfied:

$$\frac{n_2}{n_1} > 1.0$$

where $n_1$ is a refractive index of the first aspherical lens for d-line, and $n_2$ is a refractive index of the second aspherical lens for the d-line.

11. The optical system according to claim 8, wherein each of the first aspherical lens and the second aspherical lens includes an aspherical surface having an inflection point.

12. The optical system according to claim 11, wherein at least one of the first aspherical lens and the second aspherical lens includes an aspherical surface having a plurality of inflection points.

13. The optical system according to claim 1, wherein the following inequality is satisfied:

$$\left|\frac{f}{f_a}\right| \leq 0.9$$

where $f_a$ is a focal length of the front unit.

14. The optical system according to claim 1, wherein a lens closest to a reduction conjugate position has a positive paraxial refractive power and a positive refractive power at a periphery.

15. The optical system according to claim 1, wherein the following inequality is satisfied:

$$\frac{\theta_{max}}{\pi} \geq \frac{7}{18}.$$

16. An image pickup apparatus comprising:
the optical system according to claim 1; and
an image sensor configured to image an object via the optical system.

17. An in-vehicle system comprising:
the image pickup apparatus according to claim 16; and
a determiner configured to determine a likelihood of collision between a vehicle and the object based on distance information of the object acquired from the image pickup apparatus.

18. A moving apparatus comprising the image pickup apparatus according to claim 16, and movable while holding the image pickup apparatus.

19. An optical system comprising, in order from an enlargement conjugate side to a reduction conjugate side, a front unit including a plurality of lenses, an aperture stop, and a rear unit including a plurality of lenses,
wherein the rear unit has a positive refractive power,
wherein a projection characteristic $y(\theta)$ of the optical system representing a relationship between a half angle of view $\theta$ and an image height y on an image plane satisfies the following inequality:

$$1 < \frac{f \times \sin \theta_{max}}{y(\theta_{max})} \leq 1.9$$

where $\theta$max is a maximum half angle of view of the optical system, and f is a focal length of the optical system,
wherein a differential value $dy(\theta)/d\theta$ at the half angle of view $\theta$ of the projection characteristic $y(\theta)$ has a local maximum value, and
wherein the following inequality is satisfied:

$$0.15 \leq \frac{\theta_a}{\theta_{max}} \leq 0.35$$

where $\theta$a is a half angle of view at which the differential value $dy(\theta)/d\theta$ has the local maximum value.

20. An optical system comprising, in order from an enlargement conjugate side to a reduction conjugate side, a front unit including a plurality of lenses, an aperture stop, and a rear unit including a plurality of lenses,
wherein the rear unit has a positive refractive power,
wherein a projection characteristic $y(\theta)$ of the optical system representing a relationship between a half angle of view $\theta$ and an image height y on an image plane satisfies the following inequality:

$$1 < \frac{f \times \sin \theta_{max}}{y(\theta_{max})} \leq 1.9$$

where $\theta$max is a maximum half angle of view of the optical system, and f is a focal length of the optical system,
wherein a differential value $dy(\theta)/d\theta$ at the half angle of view $\theta$ of the projection characteristic $y(\theta)$ has a local maximum value, and
wherein the following inequality is satisfied:

$$0.4 \leq \frac{\theta_b}{\theta_{max}} \leq 0.6$$

where $\theta$b is a half angle of view at which the differential value $dy(\theta)/d\theta$ satisfies:

$$\frac{dy(\theta)}{d\theta} = \frac{y(\theta_{max})}{\theta_{max}}.$$

21. The optical system according to claim 1, wherein a lens closest to the enlargement conjugate side has a negative refractive power.

22. The optical system according to claim 14, wherein a lens adjacent to the lens closest to the reduction conjugate position has a negative refractive power.

* * * * *